(12) United States Patent
Srinivasan et al.

(10) Patent No.: US 11,962,601 B1
(45) Date of Patent: Apr. 16, 2024

(54) AUTOMATICALLY PRIORITIZING COMPUTING RESOURCE CONFIGURATIONS FOR REMEDIATION

(71) Applicant: Amazon Technologies, Inc., Seattle, WA (US)

(72) Inventors: Preethi Srinivasan, Sterling, VA (US); Dheeraj Kumar Mekala, Herndon, VA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/987,760

(22) Filed: Nov. 15, 2022

Related U.S. Application Data

(63) Continuation of application No. 17/034,875, filed on Sep. 28, 2020, now Pat. No. 11,516,222.

(51) Int. Cl.
*H04L 9/40* (2022.01)
*G06F 9/455* (2018.01)
*H04L 41/22* (2022.01)

(52) U.S. Cl.
CPC ........ *H04L 63/105* (2013.01); *G06F 9/45558* (2013.01); *H04L 41/22* (2013.01);
(Continued)

(58) Field of Classification Search
CPC ... H04L 63/105; H04L 63/1433; H04L 63/20; H04L 41/22; G06F 9/45558; G06F 2009/45587; G06F 2009/45595
See application file for complete search history.

(56) References Cited

U.S. PATENT DOCUMENTS 8,209,740 B1 * 6/2012 Kulaga ............... H04L 41/0853
726/12
8,689,241 B2 * 4/2014 Naik ................... G06F 11/0781
719/318

(Continued)

OTHER PUBLICATIONS

Amini et al., "A comprehensive review of existing risk assessment models in cloud computing", Journal of Physics: Conference Series, vol. 1018, No. 1, 2018, pp. 1-9.
(Continued)

*Primary Examiner* — John M Macilwinen
(74) *Attorney, Agent, or Firm* — Nicholson De Vos Webster & Elliott LLP

(57) ABSTRACT

Systems and methods for automatically prioritizing computing resource configurations for remediation include receiving information describing configuration issues that may result in impaired system performance or unauthorized access, parsing that information and automatically analyzing configuration details of a user's private computing environment to determine that assets provide an environment in which configuration issues may be exploited to produce undesired results. Such systems and methods can generate assessments indicating the likelihood an issue can be exploited and potential impacts of the issue being exploited. Such systems and methods can use these assessments to generate a report prioritizing remediation of specific configuration issues for specific vulnerable assets based on the actual configuration of the user's computing resources and the data managed using those resources. Issues deemed have a higher likelihood of resulting in problems can be prioritized over configuration issues which may appear to have severe consequences, but which are unlikely to affect the user's resources.

20 Claims, 15 Drawing Sheets

(52) U.S. Cl.
CPC ........ H04L 63/1433 (2013.01); H04L 63/20 (2013.01); *G06F 2009/45587* (2013.01); *G06F 2009/45595* (2013.01)

(56) References Cited

U.S. PATENT DOCUMENTS

| | | | | |
|---|---|---|---|---|
| 10,015,186 | B1* | 7/2018 | Tamir | .................. H04L 63/1433 |
| 10,397,255 | B1 | 8/2019 | Bhalotra et al. | |
| 2008/0270203 | A1* | 10/2008 | Holmes | .............. G06Q 30/0201 705/7.29 |
| 2013/0074188 | A1* | 3/2013 | Giakouminakis | ..... G06F 21/577 726/25 |
| 2015/0067143 | A1 | 3/2015 | Babakhan et al. | |
| 2016/0359917 | A1* | 12/2016 | Rao | ......................... H04L 41/12 |
| 2018/0330100 | A1* | 11/2018 | Bar Joseph | ........... H04W 12/08 |
| 2018/0351987 | A1 | 12/2018 | Patel et al. | |
| 2019/0188389 | A1* | 6/2019 | Peled | .................... H04L 63/105 |
| 2019/0188616 | A1* | 6/2019 | Urban | ................. G06Q 10/0875 |
| 2019/0318100 | A1 | 10/2019 | Bhatia et al. | |
| 2020/0236129 | A1* | 7/2020 | Barkovic | .............. H04L 43/045 |
| 2020/0351294 | A1 | 11/2020 | Davis et al. | |
| 2020/0358802 | A1 | 11/2020 | Viswambharan et al. | |
| 2021/0004469 | A1* | 1/2021 | Chisnall | ................ G06F 21/566 |
| 2021/0194911 | A1 | 6/2021 | Hecht | |
| 2022/0030023 | A1 | 1/2022 | Soman et al. | |

OTHER PUBLICATIONS

Chung et al., "Non-intrusive process-based monitoring system to mitigate and prevent VM vulnerability explorations", 9th IEEE International Conference on Collaborative Computing: Networking, Applications and Worksharing, IEEE, 2013, pp. 21-30.

IBM, "Remediation management: Prioritize and fix vulnerabilities that pose an imminent threat, Save time and resources with a repeatable and auditable process", IBM Security Services, 2019, 8 pages.

Mishra et al., "Taxonomy & Analysis of Cloud Computing Vulnerabilities through Attack Vector, CVSS and Complexity Parameter", 2019 2nd International Conference on Issues and Challenges in Intelligent Computing Techniques (ICICT), vol. 1, IEEE, 2019, 8 pages.

Non-Final Office Action, U.S. Appl. No. 17/034,875, dated Apr. 15, 2022, 8 pages.

Notice of Allowance, U.S. Appl. No. 17/034,875, dated Aug. 1, 2022, 5 pages.

Notice of Allowance, U.S. Appl. No. 17/034,875, dated Aug. 18, 2022, 2 pages.

Notice of Allowance, U.S. Appl. No. 17/034,875, dated Nov. 4, 2022, 2 pages.

Torkura et al., "CSBAuditor: Proactive security risk analysis for cloud storage broker systems", 2018 IEEE 17th International Symposium on Network Computing and Applications (NCA), IEEE, 2018, 10 pages.

* cited by examiner

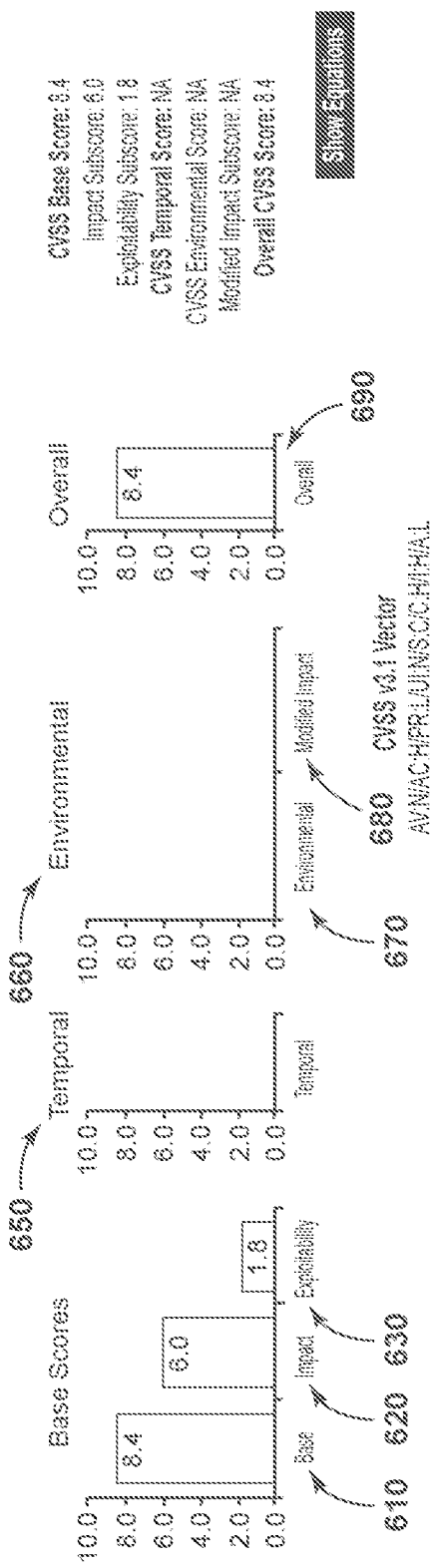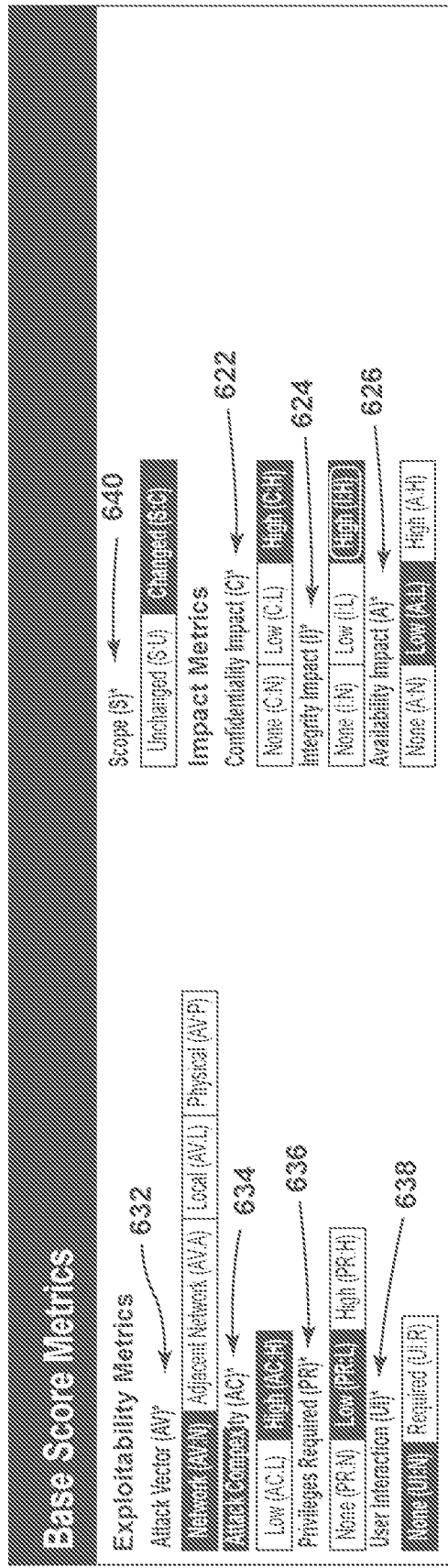
FIG. 6A

700

| Metric | Metric Value | Numerical Value |
|---|---|---|
| Access ("Attack Vector") Applies to "AV" 632, "MAV" 633 | Network | 0.85 |
| | Adjacent | 0.62 |
| | Local | 0.55 |
| | Physical | 0.2 |
| Complexity ("Attack Complexity") Applies to "AC" 634, "MAC" 635 | Low | 0.77 |
| | High | 0.44 |
| Privileges Required Applies to "PR" 636, "MPR" 637 | None | 0.85 |
| | Low | 0.62 (or 0.68 if Scope/Modified Scope is Changed) |
| | High | 0.27 (or 0.5 if Scope/Modified Scope is Changed) |
| User Interaction Applies "UI" 638, "MUI" 639 | None | 0.85 |
| | Required | 0.62 |
| Confidentiality Applies to base "C" 622 and environmental/modified "C" 623 | High | 0.56 |
| | Low | 0.22 |
| | None | 0 |
| Exploit Maturity Applies to "E" 651 | Not Defined | 1 |
| | High | 1 |
| | Functional | 0.97 |
| | Proof of Concept | 0.94 |
| | Unproven | 0.91 |
| Remediation Level Applies to "RL" 653 | Not Defined | 1 |
| | Unavailable | 1 |
| | Workaround | 0.97 |
| | Temporary Fix | 0.96 |
| | Official Fix | 0.95 |
| Report Confidence Applies to "RC" 655 | Not Defined | 1 |
| | Confirmed | 1 |
| | Reasonable | 0.96 |
| | Unknown | 0.92 |
| Confidentiality / Integrity / Aval. Required Applies to "CR" 671 / "IR" 673 "AR" 675 | Not Defined | 1 |
| | High | 1.5 |
| | Medium | 1 |
| | Low | 0.5 |

*FIG. 7*

High impact actions
Vulnerabilities that include critical & high severity findings and impact a large portion of images and instances

Top remediations
Remediations that impacted many AMIs and Images and have critical or high severity findings

| Remediation | Affected AMIs | Affected instances | Crit |
|---|---|---|---|
| Update the affected java 16.0-openjdk packages | 236 | 1369 | 253 |
| Upgrade to Oracle JDK / JRE 8 Update 20, Update 101, or 6 Update 115 or later | 251 | 223 | 220 |
| Upgrade to Adobe Flash Player version 21.0.0.213 or later | 769 | 52 | 198 |
| Upgrade to RHEL 124_553.v642 packages 6.3.00.5 | 63 | 123 | 166 |
| Update Apache HTTP Server versions 2.4.0 to 2.4.41 | 54 | 60 | 159 |

View all remediations

*FIG. 8B*

Top at-risk resources
Highest critical & high severity findings, with a trend of critical and high findings

| Organizational units | | | | Organizational Unit | Accounts | AMIs |
|---|---|---|---|---|---|---|
| Updated : 2020/03/20, 18:43 | | | | | | |
| Organizational unit | Critical | High | All | Accounts Updated : 2020/03/20, 18:43 | | |
| | | | | Account | | Critical |
| C (75 accounts) | 253 | 253 | 6398 | Account18549 | | 253 |
| E (3 accounts) | 230 | 23 | 11230 | Account23945 | | 230 |
| A (22 accounts) | 198 | 198 | 3198 | Account37350 | | 198 |
| D (125 accounts) | 166 | 29 | 5166 | Account41157 | | 166 |
| B (3 accounts) | 158 | 158 | 458 | Account56571 | | 158 |
| View all organizational units | | | | View all accounts | | |

*FIG. 8C*

Instances
Updated : 2020/03/20, 16:43

| Instance ID | Account | AMI ID | Organizational unit | Critical ▼ |
|---|---|---|---|---|
| Instance156924 | Account12387 | AMI15676 | Unit 1 | 13 |
| Instance272864 | Account26576 | AMI26647 | Unit 2 | 13 |
| Instance303557 | Account36544 | AMI36682 | Unit 3 | 13 |
| Instance414386 | Account41288 | AMI47504 | Unit 4 | 13 |
| Instance583497 | Account57525 | AMI53695 | Unit 5 | 13 |

View all instances

*FIG. 8D*

Repositories
Repositories with most critical findings | Last updated 2020/06/26 6:34 UTC

| Repository name | Account | Creation Date | Critical ▼ |
|---|---|---|---|
| Rep25854 | Account12659 | 2020/05/16, 11:04 UTC | 253 |
| Rep63258 | Account26358 | 2020/05/16, 11:04 UTC | 230 |
| Rep45052 | Account36568 | 2020/05/16, 11:04 UTC | 166 |
| Rep55670 | Account45605 | 2020/05/16, 11:04 UTC | 166 |
| Rep74566 | Account59620 | 2020/05/16, 11:04 UTC | 158 |

*FIG. 8E*

AUTOMATICALLY PRIORITIZING COMPUTING RESOURCE CONFIGURATIONS FOR REMEDIATION

CROSS-REFERENCE TO RELATED APPLICATION

This application is a continuation of U.S. patent application Ser. No. 17/034,875, filed on Sep. 28, 2020, the entire contents of which are hereby incorporated by reference as if fully set forth.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual computing resources, such as virtual machines that appear and operate as independent computing devices to users of a data center. The single physical computing device can create, maintain, delete, or otherwise manage virtual resources in a dynamic manner. In some scenarios, various virtual machines may be associated with different combinations of operating systems or operating system configurations, virtualized hardware and networking resources, and software applications, to enable a physical computing device to provide different desired functionalities, or to provide similar functionalities more efficiently.

In turn, users can request computer resources from a data center, including single computing devices or a configuration of networked computing devices, and be provided with varying numbers of virtual machine resources. Virtualization also scales upward from virtual machines; entire data centers and even multiple data centers may implement computing environments with varying capacities, such as a virtual private network and a virtual private "cloud" computing environment. A network of hardware computing devices can cooperatively use virtualization technologies to provide virtual computing resources and computing services to users of a computing resource service provider. Access to resources and data can be tightly controlled by a user account owner, an administrator, a group, a service, or the computing resource service provider itself; access can be based on many different parameters, such as user credentials, resource attributes, network configurations, and the like.

The provision of virtual computing resources as discrete instances configured for use as if they were typical data center hardware components, such as servers, disk storage, and network adapter cards, is known as infrastructure as a service (IaaS). An IaaS provider can also provide backend computing architecture implementing computing resources and services for, among other things, billing, and account management, networking support such as monitoring and load balancing, security, backup and redundancy, and resource configurations and interoperability frameworks. A user can invoke these resources and services to create workflows, automate tasks, monitor and update deployed infrastructure, and otherwise manage its computing resources. An IaaS framework can enable a user to manage its infrastructure programmatically, a concept known as infrastructure as code (IaC). The "code" in IaC is machine-readable instructions organized as discrete definitions for each infrastructure component; the provider's virtual resource management service executes the instructions to rapidly provision, configure, and deploy instances of a virtual computing resource. IaC automates infrastructure deployment and combats configuration drift by conforming virtual resource instances to the corresponding definition.

Services related to identifying potential configuration issues and remediating those issues to improve performance, data security, and other factors may be provided within the context such cloud computing and IaaS environments. A user may be provided with listings of known vulnerabilities and devices (e.g., virtual machines) which may be susceptible to exploitation of those vulnerabilities.

BRIEF DESCRIPTION OF THE DRAWINGS

Various techniques will be described with reference to the drawings, in which:

FIGS. 6A-6C are illustrations of an example scheme for assigning a numerical score to indicate the priority of remediating a configuration issue present in a computing system.

FIG. 7 is a table illustrating aspects of an example vulnerability metric for use according to embodiments herein.

FIGS. 8A-8E are illustrations of elements of an example vulnerability report generated according to embodiments disclosed herein.

DETAILED DESCRIPTION

Figure 1:
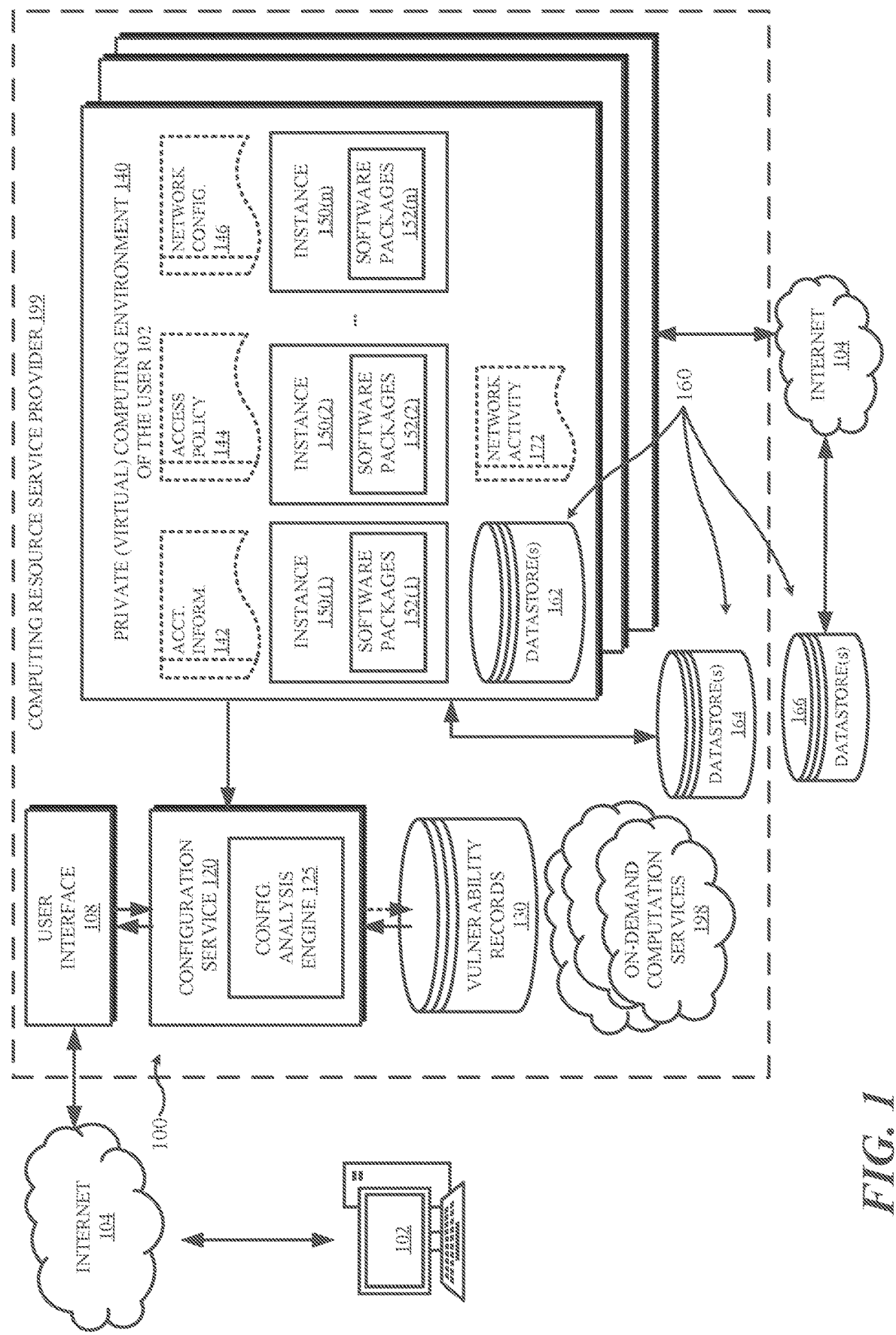
FIG. 1 is a diagram of a computing environment of a computing resource service provider, in which various embodiments of the present systems and methods can be implemented in accordance with this disclosure.

In the context of a computing resource service provider, a client makes requests to have computing resources of the computing resource service provider allocated for the client's use. One or more services of the computing resource service provider receive the requests and allocate physical computing resources, such as usage of a computer processor, memory, storage drives, computer network interfaces, and other components of a hardware computing device, to the client. In some computing systems, a virtualization layer of the computing system generates instances of "virtual" computing resources that represent the allocated portion of corresponding physical computing resources. In this infrastructure as a service (IaaS) environment, the client may operate and control, as its own computing infrastructure, instances of virtual computing resources, including without limitation: virtual machine instances each emulating a complete computing device having an operating system, processing capabilities, storage capacity, and network connections; virtual machine instances or other containers for performing specific processes; virtual network interfaces each enabling one or more virtual machine instances to use an underlying network interface controller in isolation from each other; virtual datastores operating like hard drives or databases; and the like. The computing resource service provider may provision the virtual computing resources to the client in the client's own virtual computing environment(s), which can be communicatively isolated (or restricted, e.g., via security policies) from the environments of other clients. The computing resource service provider may allow the client to configure its virtual computing resources, so they can receive connections from the computing devices of end users; the client's virtual computing resources can provide software applications, web services, and other computing services to the end users.

One or more services of the computing resource service provider may, as described further below, be responsible for allocating a virtual computing resource, configuring the virtual computing resource, and deploying the virtual computing resource into the client's virtual computing environment. An IaaS environment that implements infrastructure as code (IaC) concepts enables this resource management service to obtain a resource definition comprising program code, and interpret and execute the resource definition to identify the resource type, allocate the appropriate virtualized physical resources for a virtual resource instance of the corresponding type, apply a defined configuration to the virtual resource instance, and deploy the virtual resource instance into the virtual computing environment. Virtual computing resources are deployed into a client's virtual computing environment by creating the instance within corresponding resources allocated to the environment and connecting the instance to other virtual computing resources and sometimes also to computing networks that interface with end user devices. In one implementation, the virtualization layer (e.g., containing one or more hypervisors) of the computing system generates one or more virtual networks within the environment, and a new instance receives an address (e.g., an IPv4 address) on the virtual network and can then communicate with other components on the virtual network. The virtual network may be attended by physical or virtual networking components such as network interfaces, firewalls, load balancers, and the like, which implement communication protocols, address spaces, and connections between components and to external communication networks (e.g., the internet and other wide-area networks). In various implementations, a client can configure various aspects of the virtual network and its attendant components.

A computing resource service provider may also provide certain services transparently on behalf of a user or client. In such instances, the computing resource service provider may manage certain resources within its own computing environment in connection with virtualized resources over which the user is provided with direct access or control. In one example, the computing resource service provider may provide reports to a user listing activities that are determined to be anomalous and/or indicative of possible unauthorized access, including network activities, logins, and the like occurring within resources provided within a private computing environment controlled by the user. In another example, the computing resource service provider may provide reports to the user identifying potential and/or observed security vulnerabilities. These reports may be generated by one or more security analysis tools operated by the computing resource service provider and may take into account particular configurations of resources (e.g., virtual machines and datastores) belonging to or allocated to the user. Such security analysis reports may be voluminous and it may therefore be desirable to present lists of vulnerabilities in a manner prioritizes certain notices over others based on factors such as the degree of exposure of user resources to outside attackers, the possible severity of consequences of unauthorized access to different user resources, and configurations of particular resources (e.g., software packages installed on different virtual machines, network configurations of different machines, etc.), as non-limiting examples.

The present disclosure provides systems and methods for reporting potential configuration problems in a prioritized fashion that accounts for the actual configuration of the user's computing environment and computing resources including datastores and other information resources accessible from within the computing environment.

In one embodiment, a system comprises one or more processors and memory storing computer-executable instructions. The instructions, when executed by the one or more processors, cause the system to retrieve account information of a user account from a datastore of a computing resource service provider. The account information identifies a virtual machine instance (VMI) operating in a private computing environment of the user within a computing environment of the computing resource service provider. Executing the instructions further causes the system to execute database query to retrieve a vulnerability description from a vulnerability datastore. The vulnerability description is associated with a vulnerability and includes information that encodes a baseline priority score, a baseline access score, and a baseline privilege score. Executing the instructions further causes the system to parse the vulnerability description to determine a first software package associated with the vulnerability and the baseline priority score, the baseline access score, and the baseline privilege score.

The VMI is configured by the computing resource service provider in accordance with device configuration information. Executing the instructions further causes the system to retrieve the device configuration information associated with the VMI from a datastore of the computing resource service provider. Executing the instructions further causes the system to parse the device configuration information to identify a group of software packages installed within the VMI and determine that the first software package is in the group of software packages installed within the VMI. Executing the instructions further causes the system to retrieve network configuration information of the private computing environment that defines a maximum level of network access to the VMI. Executing the instructions further causes the system to determine a maximum privilege level allowed for applications executing within the VMI defined by the device configuration information, convert the maximum level of network access to a system access score according to a predefined vulnerability metric definition, convert the maximum privilege level to a system privilege score according to the predefined vulnerability metric definition, and generate a vulnerability priority score for the vulnerability.

Generating vulnerability priority score for the vulnerability includes providing the baseline priority score, the baseline access score, the baseline privilege score, the system access score, and the system privilege score as inputs to a weighting function specified by the predefined vulnerability metric definition. The weighting function outputs the vulnerability priority score for the vulnerability according to weighting rules specified by the vulnerability metric definition. Executing the instructions further causes the system to display a vulnerability report to the user via a user interface provided by the computing resource service provider, the vulnerability report identifying the vulnerability and associating the vulnerability with the vulnerability priority score.

In another embodiment, a system comprises one or more processors and memory storing computer-executable instructions. The instructions, when executed by the one or more processors, cause the system to retrieve a vulnerability description associated with a vulnerability. The vulnerability description indicates a required configuration characteristic of a computing device to exploit the vulnerability, a baseline priority score for the vulnerability, and that exploiting the vulnerability may permit unauthorized access to computing resources. Executing the instructions further causes the system to determine a vulnerability metric definition associated with the vulnerability description. Executing the instructions further causes the system to determine that first device configuration information of a virtual machine instance (VMI). The VMI operates within a private computing environment provided by a computing resource service provider within a computing environment of the computing resource service provider on behalf of a user. Executing the instructions further causes the system to determine that the VMI has the required configuration characteristic. Executing the instructions further causes the system to determine a level of data sensitivity for information accessible from the VMI and generate a vulnerability priority score for the vulnerability.

Generating the vulnerability priority score for the vulnerability includes converting the level of data sensitivity for information accessible from the VMI into a data sensitivity score and providing the baseline priority score and the data sensitivity score as inputs to a weighting function specified by the vulnerability metric definition. The weighting function is configured to output the vulnerability priority score for the vulnerability according to weighting rules specified by the vulnerability metric definition. Executing the instructions further causes display a vulnerability report to the user that identifies the vulnerability and associates the vulnerability with the vulnerability priority score via a user interface provided by the computing resource service provider.

In another embodiment, a method of automatically evaluating a configuration of a computing system includes retrieving a vulnerability description associated with a vulnerability, the vulnerability description indicating that exploiting the vulnerability may permit unauthorized access to computing resources and indicating a required configuration characteristic of a computing device to exploit the vulnerability, and a baseline priority score for the vulnerability. The method further includes determining a vulnerability metric definition associated with the vulnerability description, and determining that first device configuration information of a virtual machine instance (VMI) has the required configuration characteristic. The VMI operates within a private computing environment provided by a computing resource service provider for use by a user.

The method further includes determining a level of data sensitivity for information accessible from the VMI and generating a vulnerability priority score for the vulnerability. Generating the vulnerability priority score for the vulnerability includes extracting a baseline priority score indicated by the vulnerability description, converting the level of data sensitivity for information accessible from the VMI into a data sensitivity score, and providing the baseline priority score and the data sensitivity score as inputs to a weighting function specified by the vulnerability metric definition. The weighting function is configured to output a vulnerability priority score for the vulnerability according to weighting rules specified by the vulnerability metric definition. The method further includes displaying a vulnerability report to the user that identifies the vulnerability and associates the vulnerability with the vulnerability priority score via a user interface provided by the computing resource service provider.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described. Although systems and services may be described as operating within a computing environment of a computing service resource service provider or outside that environment, It will be understood that devices and services depicted in the Figures as inside particular virtual computing environments may be suitably modified to operate outside those environments or within other environments. Similarly, services depicted in the Figures as outside particular virtual computing environments may be suitably modified to operate inside those environments or within similar environments.

A configuration service, as described in detail below in connection with embodiments herein, may generate vulnerability reports for users indicating potential problems that may require remediation. As a simplified example, a vulnerability report may include a list of software packages installed within a user's computing environment (e.g., a "private cloud") provided by a computing resource service provider that provides private computing environments and related services to multiple users within a larger computing environment of the provider. The software packages listed in the vulnerability report may include software packages that are known or suspected to have bugs or design shortcomings that may compromise the security of the user's computing environment by allowed unauthorized access to computing resources (e.g., physical or virtual computing devices) and information within the user's computing environment or accessible from the user's computing environment. A vulnerability report may thus be used to alert a user to software packages that may present problems the user should consider remediating by, for example, updating the software packages, or changing the configuration of the software packages and/or the machines running them within the user's computing environment. A vulnerability report may also include problems that are related to the configuration of a machine or the configuration of software running on a machine. For example, certain common Internet protocol ports are frequently used in attempts to gain unauthorized access to computing systems. A vulnerability report may alert a user to misconfigured devices and provide recommendations to reconfigure misconfigured devices. For instance, if a machine is exposed to external networks including the Internet via a common transmission control protocol (TCP) port but does not need to communicate via that port, a vulnerability report may provide a recommendation to reduce the risk of undesired access to the machine by closing that port.

Vulnerability descriptions may be provided in a format specified by a vulnerability scoring system (VSS). A VSS may define a vulnerability metric that specifies algorithms for assigning priority values to a vulnerability description. The VSS may use a weighted combination of various subscores to determine an aggregate priority score for a vulnerability. Priority scores and subscores may be scalar values, or qualitative descriptors, as non-limiting examples. Such scores and subscores may be generated by inputting characteristics of a vulnerability and a computing resource being evaluated into a weighting function defined by the vulnerability metric definition of the VSS. Examples of a VSS are versions of the Common Vulnerability Scoring System (CVSS), including CVSS 3.1 Revision 1. A VSS can detail, for a particular identified software package vulnerability, a description of the vulnerability (including a numerical and machine-readable indication of the severity of the vulnerability).

A shortcoming of standardized reports using a VSS or other formats that define vulnerability metrics is that, by definition, they provide generalizations and there is no way to know whether a misconfiguration such as operating a software package with a flaw that can be exploited to enabled unauthorized access or cause other problems represents a relatively high risk or a relatively low risk to any specific computing device. A computing device may be configured in such a way that a vulnerability cannot be exploited, lowering the risk associated with that vulnerability (or the urgency of remediating it). Alternatively, a computing device may be configured (or misconfigured) such that a seemingly low-risk vulnerability actually presents a much greater risk than otherwise indicated by a vulnerability description.

Vulnerability descriptions may also, for each vulnerability, identify of a set of environmental requirements that must be met by the computing environment in order for the vulnerability to be triggered or activated. These environmental requirements may be defined within a VSS report as a set of numerical values which define the environment requirements that are pre-requisite for the vulnerability to be exploited. For example, some vulnerabilities may only be exploited if physical access to a device is available. For a physical computing device, this might entail accessing integrated circuits inside the device. For a virtual computing device (e.g., a virtual machine) provided by a computing resource service provider, "physical" access might entail accessing physical machines operated by the computing resource service provider or obtaining remote access to those machines and manipulating software objects representing virtualized hardware components. A VSS may provide rubrics for modifying a general description of risks (essentially a "guess") associated with a vulnerability to account for the configuration of a specific device. However, increasingly complex system configurations may be difficult or impossible for a human to fully understand and describe, making it difficult to accurately evaluate even a single vulnerability with respect to a single computing device, let alone with respect to tens, hundreds, or thousands of vulnerabilities. Furthermore, users may administer tens, hundreds, or thousands of assets which may include computing devices and/or other assets, including datastores, access credentials, and settings for online computing services subscribed to by those users, and so on.

Referring to FIG. 1, embodiments of the present disclosure may operate within or upon a computing environment 100 of a computing resource service provider 199 accessible by a user 102 (represented by a user computing device) via a computer network 104 such as the Internet. The computing resource service provider 199 may provide various interfaces to the user 102 such as the user interface 108. The user interface 108 may be provided via websites, web applications, command consoles, and application programming interfaces (APIs) and the like, as described further below. The user 102 interacts via the user interface 108 with a configuration service 120 operating within the computing environment 100 of the computing resource service provider 199. Various virtual computing environments (VCEs)—e.g., the VCE 140 of the user 102 shown—may be provided within the computing environment 100 of the computing resource service provider 199.

As shown, the VCE 140 of the user 102 may store various information, or may be associated with such information, including, as non-limiting examples, account information 142, an access policy 144, a network configuration 146, and logs of network activity 172 associated with the VCE 140. Virtual machine instances (e.g., machine instances 150, represented by the set of machine instances {150(1), 150(2), 150(n)}) may be operated within the VCE 140 by or on behalf of the user 102. The account information 142 may include information identifying the user 102 associated with the VCE 140 as well as a list of the machine instances 150 and/or virtual machine images (not shown) used to configure and/or instantiate the machine instances 150. The access policy 144 may specify resources to which the machine instances 150 and/or user or client accounts associated with those instances may access. The machine instances 150 and/or authorized users thereof may access various datastores 160. The datastores 160 may include datastores within the VCE 140 such as the datastore(s) 162 as well as external datastores such as the datastore(s) 164 provided within the computing environment 100 of the computing service resource provider 199, or datastore(s) 166 which may be accessible via the Internet or another network external to the computing environment 100 of the computing resource service provider 199. Each machine instance 150 may be provided with a corresponding sets of software packages 152 represented by the software packages {152(1), 152(2), . . . , 152(n)}. The software packages 152 may include operating systems, client programs, server programs, system agents and daemons, and the like. Network traffic to and from the machine instances 150 may be stored within the VCE 140 or stored elsewhere within the computing environment 100 of the computing resource service provider 199 and associated with the VCE 140 and/or the user 102.

In addition to providing private computing environments on behalf of users, the computing resource service provider 199 may provide additional services within its own computing environment 100. As an example, computing resource service provider 199 may provide one or more on-demand computation services 198. Users (e.g., the user 102) may interact with such on-demand services and others services via the Internet or via respective private computing environments (e.g., a VCE 140). As a nonlimiting example, an on-demand computation service 198 may allow the user 102 to execute code without provisioning or managing physical or virtual machines (e.g., the machine instances 150). Such an on-demand computation service may be configured to execute code only when needed to scale automatically and transparently to the user 102. These features may allow a user to run well-defined computational tasks with lower costs and less administrative effort than provisioning, configuring, and executing machine instances 150 within a VCE 140. Because an on-demand computation service instance may be run on-the-fly, it may not have a persistent state when in operation and may be unable to store data for later use. As a result, the user 102 may configure instances of the on-demand computing services 198 to access one or more datastores 160.

The configuration service 120 is a service provided by the computing resource service provider 199 to users to assist them with identifying and mitigating undesired configuration choices which may result in suboptimal performance, increased risk of downtime, and potentially enable for unauthorized access to computing resources within (or accessible from within) the virtual computing environment(s) 140 of the user. The configuration service 120 may receive reports and other information concerning security threats, such as the vulnerability records 130 describing characteristics of software packages and applications that may incorporate particular issues, such as vulnerabilities, that could, in certain circumstances cause improper operation of the software packages. In some embodiments, the vulnerability records may be stored as depicted in a database or other datastore within the computing environment 100 of the computing resource service provider 199.

In some embodiments, the vulnerability records 130 may have a common format such as that defined by a VSS (e.g., the example VSS described below in connection with FIGS. 6A-6C) that assigns numerical scores to indicate the severity of different vulnerabilities. The vulnerability records 130 may be obtained in any acceptable manner. As non-limiting examples, a system may be configured to periodically retrieve a file containing all vulnerabilities discovered (and then described) within a particular time period (e.g., by executing a database query to retrieve the file from a datastore), receive notifications including newly-described vulnerabilities, monitor an RSS feed that publishes alerts including new vulnerability descriptions or links to such descriptions, and so forth. Vulnerability descriptions may also come from within a system. For example a computing system may include a computing process or access a service that monitors the system (or multiple systems) for performance issues or other undesired behavior and learns system configuration details that are predictive of problems occurring.

The configuration service 120 may process this and other information using a configuration analysis engine 125 to produce reports and/or recommendations to a user that assigns one or more numerical or qualitative scores to a particular vulnerability indicating, for that vulnerability, the relative severity of the vulnerability for that particular user in light of the configuration of a particular VCE 140 belonging to that user and machine images 150 within that VCE 140, as described further below. In some embodiments, some or all of the vulnerability records may be retrieved from one or more third parties. In some embodiments, at least some of the vulnerability records may be generated by the configuration service 120 or other services operating within the computing environment 100 of the computing resource service provider 199, as described further below. In some embodiments the configuration service 120 parses vulnerability descriptions belonging to the vulnerability records 130 to determine respective software packages associated with each vulnerability and to determine a baseline priority score, a baseline access score, and a baseline privilege score, and/or other scores, characteristics, or attributes associated with each vulnerability).

The access policy 144 may be provided to the computing resource service provider 199 (or generated by the computing resource service provider 199 in response to input received from the user 102 via the user interface 108) in a human-readable format such as JavaScript Object Notation (JSON), extensible markup language (XML), or any other format, including program code and/or suitable machine-readable formats. The access policy 144 may be conceptually similar to the idea of file permissions managed by an operating system which defines whether a files may be read, written to, or executed by a particular user or computing process. However, rather than controlling actions at the level of an operating system of a single device, the access policy may be used to be control actions within the entire VCE 140 of the user 102, as indicated by the following example:

```
"Statement" : [ {
    "Condition" : {
        "StringLike" : {
            "ClientId" : "id*" },
    "Resource" : [
        "ResourceName"],
    "Action" : "Connect",
    "Effect" : "Allow"
} ]
```

As illustrated by the example above, an access policy is specified using one or more "Statement" structures which may allow a user such as the user 102 to specify conditions to apply to incoming network connections and requests directed to assets within the VCE 140 (or associated with them) and functions or operations to use in evaluating those conditions. Requests matching the condition(s) are allowed to access resources such as the machine instances 150 by performing one or more actions allowed by the system. For instance, the example above specifies a condition which is matched any ClientID appearing in a field of the request labeled "ClientID" of the form 'id*', where * indicates a wildcard. The policy statement next specifies that the policy statement applies only to a particular resource, although that resource may be specified as a function of the ClientID in the request (i.e., policy statements may contain variables). Next, the policy statement specifies that the statement pertains to a particular action denoted by "Connect." Finally, the policy statement specifies how request should be handled, namely that the Connect action should be allowed for requests that match the specified ClientID and a unique resource corresponding to the particular ClientID.

In some embodiments, the access policy 144 may be contained a single document or file. In other embodiments, the access policy 144 may be defined in segments relating to a particular resources or users. For instance, a machine instance 150 may be associated with access policy statements that the control access to that machine instance and/or control actions permitted for that machine instance. In the example below, the policy statement includes a "Requestor" condition that identifies the machine instance to which the statement is applied. However, access policy statements may be associated by the VCE 140 with specific resources such that explicitly declaring the resource to which a statement is applied may not be necessary. The access policy 144 may be defined any combination of access policy statements associated with resources, users, or actions within the VCE 140 the account of the user 102 with computing resource service provider 199. For instance, the following example access statement determines that a machine instance 150 ("MachineName") is allowed to perform two actions ("MountVolume" and "UnmountVolume") with respect to a virtual storage volume identified by "VolumeName"):

```
"Statement": [ {
    "Effect" : "Allow",
    "Action": [
        "Mount Volume", "Unmount Volume" ],
    "Resource" :
        [ "VolumeName" ] ,
    "Condition" :
        { "Requestor": { "MachineName" : }
} ]
```

An access policy statement may define many more actions than the previous examples. For instance, the example policy statement below, when associated with a particular device or a particular user allows that device or using to perform the following actions with respect to a datastore (a "bucket" named "Bucket1"): listing the contents ("ListBucket"), uploading data to datastore ("PutObject"), downloading data from the datastore ("GetObject"), delete data from the datastore ("DeleteObject") and alter access permissions of data stored by the datastore ("PutObjectAcl," where 'Acl' refers to the access control list for the datastore).

```
"Statement": [ {
    "Effect" : "Allow",
    "Action": [
        "ListBucket",
        "PutObject",
        "GetObject",
        "DeleteObject",
        "PutObjectAcl" ]
    "Resource" :
        [ "Bucket1" ] ,
} ]
```

In general, the user 102 can access the user interface 108 via any computing device such as a desktop, laptop, mobile phone (or smartphone), tablet, kiosk, wireless device, and other electronic devices. Such computing devices may include web services running on the same or different data centers, where, for example, different web services may programmatically communicate with each other to perform one or more techniques described herein. The user interface 108 may be realized using one more approaches, including CLIs, APIs, and/or other programmatic interfaces.

A network 104 that connects a device of the user 102 to the computing resource service provider 199 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. In some embodiments, the network 104, may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Accordingly, a user 102 may access the computing resource service provider 199 via a user interface 108, which may be any suitable user interface that is compatible with the computing device of the user 102 and the network 104, such as an API, a web application, web service, or other interface accessible by the computing device of the user 102 using a web browser or another software application, a command line interface, and the like. In some embodiments, the user interface 108 may include code and/or instructions for generating a graphic console on computing device of the user 102 using, for example, markup languages and other common web technologies. The user interface 108 may, via the computing device of the user 102, present a user with various options for configuring, requesting, launching, and otherwise operating functions provided by the configuration service 120 to generate, view, and act upon reports identifying configuration issues. User input (e.g., text, computer files, selected elements from a list or menu, mouse clicks on buttons, and other interactions) entered into the user interface 108 by the user 102 may be received and processed by the configuration service 120 of the computing resource service provider 199, or by processes operating within the virtual computing environment(s) 140. For example, the client may use the user interface 108 to provide a request to generate a report or perform related functions to the configuration service 120 and configure operation of the configuration service 120 by selecting from configuration options displayed by the user interface 108. The user 102 may also use the user interface 108 to upload and download files to and from datastores such as the datastore(s) 130. The user 102 may also use the user interface 108 to view and interact with vulnerability information as illustrated by FIGS. 8A-8E and described below in connection with those figures.

Figure 2:
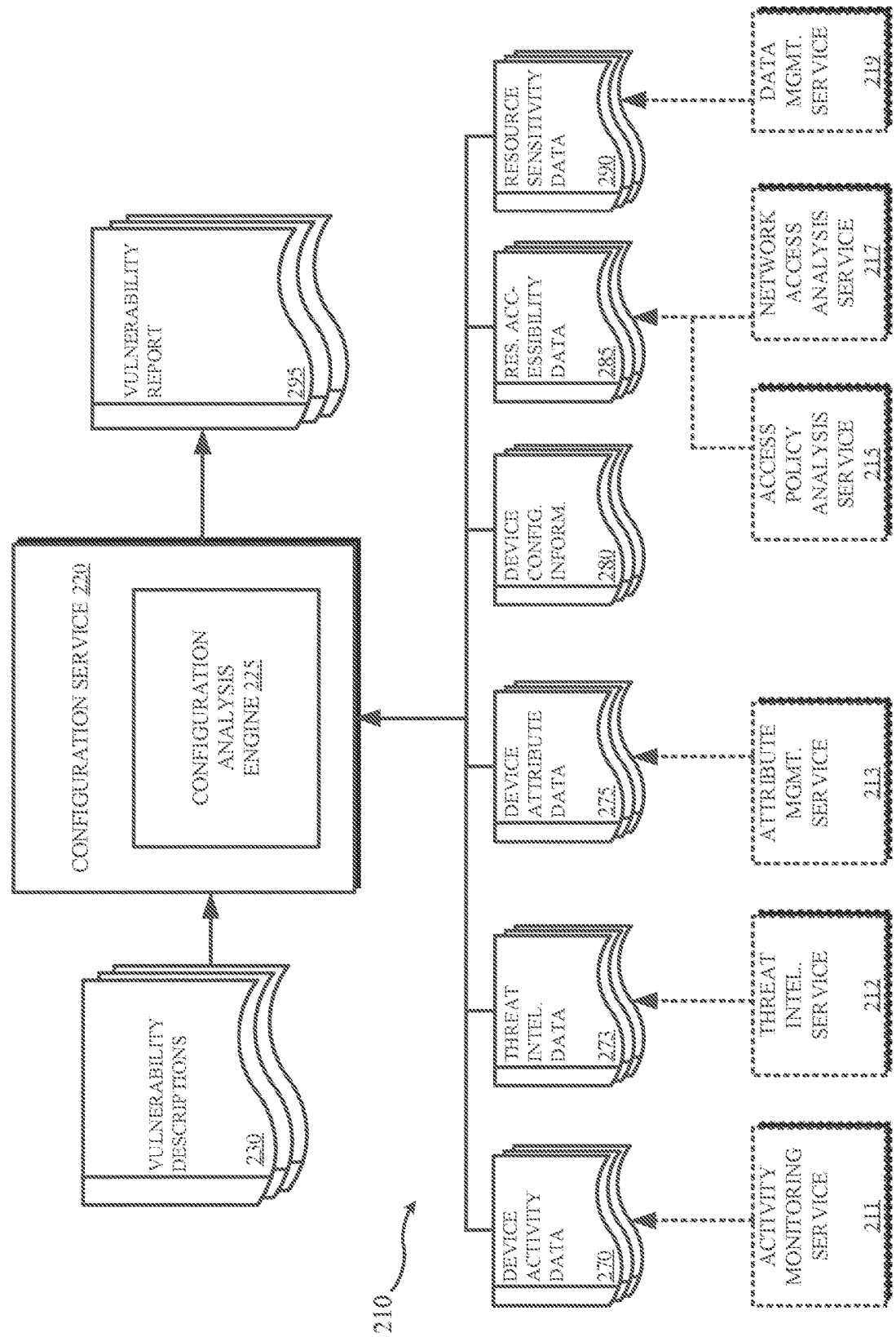
FIG. 2 is a flowchart illustrating interactions between elements shown in FIG. 1.

FIG. 2 is a simplified block-level representation of operation of a configuration service 220 that includes a configuration analysis engine 225 (e.g., the configuration service 120 and the configuration analysis engine 125 of FIG. 1). Referring to FIG. 2, the user 102 may provide a request to generate a vulnerability report 295 to the configuration service 220 or the computing resource service provider 199 may cause the configuration service 220 to periodically generate the vulnerability report 295. The configuration service may also continuously update the vulnerability report 295 in response to "push" or other notifications, or monitoring data sources for new information. The vulnerability report 295 may include a list of vulnerabilities and recommended priorities ("priority indications," or "priority scores") for mitigating those vulnerabilities relative to each other and/or to other vulnerabilities. In some embodiments the configuration service 220 may be configured to receive device configuration information for one or more devices and information summarizing the configuration(s), and to generate an initial vulnerability report. The system may be further configured to receive a message or otherwise detect that a new or updated vulnerability description 230 is available and to generate an updated report to reflect a current priority score for the new or updated vulnerability description. In some embodiments, the system may be configured to receive a message or otherwise detect that the configuration of computing device or other resource has changed update the vulnerability report 295 in response to that change by reevaluating vulnerabilities in light of the configuration change.

In some embodiments, the vulnerability report may be organized by vulnerability priority and then optionally by asset priorities. As an example, the vulnerability report 295 may identify a vulnerability associated with a particular version of a networking software package. The system may determine, based on machines configured to run the networking software package, additional assets and resources those machines have access to, and the nature of information stored or managed by those assets or resources, that mitigating the vulnerability associated with the particular version of the networking software package should be prioritized over mitigating other software vulnerabilities. The report may further prioritize mitigation of the networking software package vulnerability by assigning relative priorities to each of the machine instances or machine images used to instantiate those instances. In other embodiments, the vulnerability report 295 may be organized by asset priority and may be optionally further organized by vulnerability priorities. For instance, the report may identify a particular asset (e.g., a VM instance 150 or a corresponding machine image) and recommend a high priority for mitigation and then further identify vulnerabilities associated with that asset optionally ordered by recommended priorities for mitigating those vulnerabilities.

As shown, the configuration service 220 may receive a database or other collection of vulnerability descriptions 230 as an input. For example, the configuration service may periodically retrieve the vulnerability descriptions 230 from an external service using a network protocol such as file transfer protocol (FTP) or hypertext transfer protocol (HTTP). In some embodiments, the configuration service 220 may retrieve the vulnerability descriptions 230 from another service (which may be operated by the computing resource service provider 199 or another party) via an API call or any other suitable mechanism. The vulnerability descriptions 230 may include, as non-limiting examples, one or more of the following: security vulnerability descriptions originating from third parties, (e.g., the machine instances 150), vulnerability descriptions generated by the configuration service 220 or another service operating within the computing environment 100 of the computing resource service provider 199, reports indicating undesirable configurations of devices (or account settings of user's private computing environment, e.g., the VCE 140) associated with higher security risks, and so on. As an example, the configuration service 220 may receive, or generate, a report indicating that one or more assets is configured to run various processes (e.g., a web server process) with root-level privileges. As another example, the configuration service 220 may receive, or generate, a report indicating that certain port for internet protocol (IP) communications commonly used for attacks are exposed unnecessarily (e.g., TCP ports 21, 22, 23, 25, 80, etc.).

Each of the vulnerability descriptions 230 may identify a specific vulnerability and provide numerical or qualitative descriptions of characteristics of the vulnerability. As an example, a common VSS is often used to assign up to three numerical scores to a vulnerability: a baseline priority score (a "base score") indicative of an estimated severity (i.e., a recommend priority indication for mitigating the severity), one or more temporal scores indicating whether an exploit is currently known for the vulnerability and how readily the vulnerability may be mitigated, and one more environmental scores indicating the degree to which the severity of the vulnerability may be mitigated or exacerbated by individualized circumstances. A vulnerability metric definition may be used to convert qualitative assessments of the characteristics of an exploit and mitigating or exacerbating circumstances into numerical values. The configuration service 220 may extract qualitative characteristics of a vulnerability from records specified in any suitable format. Such formats may include file formats such as XML and JSON. In some embodiments, the configuration service 220 may employ natural language processing algorithms to extract characteristics of a security vulnerability from a natural language description of the vulnerability.

While vulnerability records using a VSS format and similar formats frequently describe software packages that may have exploitable bugs and other flaws, vulnerabilities may also include system configurations that do no employ best practices. For example, in some applications, it may be unnecessary for particular applications or functions to run with a high level of access privileges (e.g., running as the "root" user in UNIX and UNIX-like systems) or to otherwise allow users and ordinary applications to access such privilege levels. In such applications, one example of a vulnerability would be a system configuration that allows a user to access the system by logging in as the root account or using a command that allows the user to perform certain operations as the root account (e.g., the "sudo" command in UNIX and UNIX-like systems). Other vulnerabilities, as described above, may relate to networking configurations. Meanwhile, within the context of a cloud environment such as the computing environment 100 of the computing resource service provider 199 and VCEs 140 in that environment, vulnerabilities may also be related to configuration of VCEs 140 and user accounts associated with those VCEs. As one nonlimiting example, a vulnerability may be related to access policies (e.g., the access policy 144) associated with a VCE 140.

A vulnerability may be described by at least one and up to three top level scores according to a VSS (e.g., the example VSS described below in connection with FIGS. 6A-6C): a baseline priority score (or "base score") indicative of an estimate of the severity of a vulnerability that does not account for mitigating and exacerbating factors that may be unique to particular set of circumstances, and temporal and environmental scores which attempt to account for particular sets of circumstances that may be unique to a particular user and a corresponding computing environments. An overall vulnerability priority score may be calculated as a weighted sum of these scores, using an algorithm defined by the VSS. The overall vulnerability priority score may be higher or lower than the baseline priority score, depending on the circumstances captured by the temporal and environmental scores. Each of the base, temporal, and environmental scores may be determined, in turn, by various subscores which serve as inputs to a weighting function defined by the VSS vulnerability metric as illustrated in FIGS. 6A-6C and FIG. 7, as described further below.

The configuration service 220 may invoke the configuration analysis engine 225 in order to generate one or more reports indicating the relative priority of mitigating the known vulnerabilities 230, using information indicative of the unique circumstances of assets within the VCE of a user (e.g., the VCE 140 of the user 102) to create a customized priority indication for vulnerabilities that reflects the actual configuration of the user's VCE and resources within that VCE (or accessible from that VCE). In some examples, a particular vulnerability may be relevant to multiple devices.

In some embodiments configuration analysis engine 225 may average the priority scores for that vulnerability or use the highest priority score generated for an individual device as the priority score for that vulnerability.

In some embodiments, the configuration analysis engine 225 may generate a vulnerability report that ranks devices (e.g., machine instances 150) or other assets instead of (or in addition to) ranking vulnerabilities. For instance, the configuration analysis engine 225 may generate a vulnerability priority score each vulnerability relevant to a particular device. The configuration analysis engine 225 may then generate a device priority score that averages the vulnerability priority scores each vulnerability, or otherwise combines them to indicate an overall priority score for all vulnerabilities relevant to the particular device. These device scores may be used to determine which devices (e.g., which of the machine instances 150) have the most urgent configuration issues for mitigation.

In order to generate an individualized vulnerability report, the configuration service 220 may receive multiple forms of information specific to the configuration of the particular computing environment of a user (e.g., the VCE 140 of the user 102) and assets within that environment and/or associated with that environment (e.g., one or more of the machine instances 140 and/or one or more of the datastores 160) and may use the configuration analysis engine 225 to produce individualized scores according to a vulnerability metric definition provided by a VSS. For example, a particular vulnerability may enable an asset and its data to be completely compromised. However, it may be impossible for the vulnerability to be exploited unless the asset is accessible from the Internet (or from another network outside the computing environment 100) or it may be impossible to exploit the vulnerability unless the asset also uses a particular operating system version or has a particular configuration characteristic. Thus, a vulnerability with potentially "severe" consequences may pose little or no threat to a particular asset, depending upon other variables which may be unique to a particular computing environment of a user. In this example, the configuration analysis engine 225 may apply a weighting factor to a pre-existing priority indication such as a baseline priority score, a temporal score, an environmental score, or an overall vulnerability score. In another example, the configuration analysis engine 225 may generate one or more of a temporal score, an environmental score, an environmental or temporal subscore, or other similar scores and subscores according to any suitable vulnerability metric definition. In some embodiments, the configuration analysis engine 225 may be configured to generate priority indications for vulnerabilities and individual assets using a customized metric supplied by the user, the computing resource service provider 199, or another party.

The configuration service 220 may gather data from various sources in order to determine individualized weighting factors used to determine a vulnerability priority score. As non-limiting examples, the configuration service 220 may receive the device activity data 270, the threat intelligence data 273, the device attribute data 275, the device configuration information 280, the resource accessibility data 285, and the resource sensitivity data 295. The configuration service 220 may be configured to periodically retrieve input data described above and/or similar data from one or more datastores or may be configured to retrieve input data in response to a notification (e.g., a push notification) or message received using a message-passing API from one or more other services operated by the computing resource service provider 199 or one or more third parties. The configuration service 220 may use the threat intelligence data 273 to generate one or more scores ("threat scores") for use as a weighting factor in determining vulnerability priority scores as described further below.

The device activity data 270 may include records of network traffic to and/or from assets associated with a user (e.g., the network activity 172 of the machine instances 150 within the VCE 140). The device activity data 270 may also include logs or other information indicating operations performed within or in connection to various assets (e.g., the machine instances 150). For example, the device activity data 270 may include logs of user activities (e.g., logins, file system operations) within a VCE and/or devices within the VCE. In some embodiments, the configuration service 220 may be configured to retrieve the device activity data 270 from one or more datastores provided by the computing resource service provider 199, while in other embodiments, the configuration service 220 may query or otherwise communicate with another service.

The configuration analysis engine 225 may use device activity data 270 to determine that an asset is at higher or lower risk based on network or other system activity. For instance, an asset that receives no traffic from public networks such as the Internet or other networks outside the computing environment of the computing resource service provider, (e.g., outside the computing environment 100) may be inferred to be at lower risk than one that receives traffic from public networks. In some embodiments, the configuration service 220 may obtain some or all of the device activity data 270 from an activity monitoring service 211 which may be operated by the computing resource service provider 199 or a third party. In some such embodiments, the activity monitoring service 211 may form a part of the configuration service 220. The activity monitoring service 211 service may continuously monitor for malicious activity and unauthorized behavior associated with the VCE of a user or a user account of the user 102 provided by the computing resource service provider 199.

The activity monitoring service 211 may monitor account servicing operations (e.g., accessing account information, adding additional users, changing configurations, etc.) workloads (i.e., consumption of computing resources provided by the computing resource service provider 199), and data stored in datastores provided by the computing resource service provider 199. An activity monitoring service such as the activity monitoring service 211 may use machine learning, anomaly detection, and integrated threat intelligence to identify and prioritize potential threats. The activity monitoring service 211 may analyze tens of billions of events across multiple data sources, such as event logs, network traffic logs, and domain name service (DNS) logs, and so on. In some embodiments, an activity monitoring service may generate, as the device activity data, only activity that is classified by the activity monitoring service as unusual or indicative of higher risk.

In some embodiments, the configuration service 220 may obtain some or all of the threat intelligence data 273 from a threat intelligence service 212 which may be operated by the computing resource service provider 199 or a third party. In some such embodiments, the threat intelligence service 212 may form a part of the configuration service 220. The threat intelligence data 273 may include information indicating a subset of vulnerabilities described by the vulnerability records 230 that are known to have been exploited as well as other information which may be useful for determining one or more vulnerabilities present a greater or lesser risk than might be indicated by the corresponding vulnerability descriptions 230 for those vulnerabilities. In some embodiments, the threat intelligence service 212 may analyze the device activity data 270 using machine learning algorithms, heuristics, or other suitable methods to determine that the device activity data 270 indicate that a particular environment, device, or other resource is experiencing anomalous activity.

The threat intelligence service 273 may determine that anomalous activity indicates a performance or security issue. For instance certain patterns of activity may be correlated with the presence of a misconfigured software package, malware, or an attack (e.g., a denial of service attack, or an attempt to exploit a particular vulnerability). The threat intelligence service 212 may receive or generate profiles of system activities ("system activity profiles") associated with attempts to exploit particular vulnerabilities or classes of vulnerabilities. Non-limiting examples of system activity profiles include patterns of communication using particular Internet protocol ports, patterns of particular data packet payloads, patterns of attempting logins using various user IDs, attempted login using particularly combinations of user IDs and passwords (e.g., attempts to login using default account credentials for particular services or devices), and so forth, that may be associated with attempts to exploit particular vulnerabilities. System activity profiles may be generated by monitoring system activity (e.g., the device activity data 270) over a period of time in which attempts to exploit a vulnerability are known to have occurred and determining characteristics of the system activity that are correlated with the attempts to exploit the vulnerability. Such correlations may be determined using any suitable methods, including supervised and unsupervised machine learning methods. In such instances, the configuration service 220 may use the threat intelligence data 273 to determine that a computing device or other resource is at increased risk with respect to one or more of the vulnerability record 230.

In some embodiments, the configuration service 220 may obtain some or all of the device attribute data 275 from an attribute management service 213 which may be operated by the computing resource service provider 199 or a third party. In some such embodiments, the attribute management service 213 may form a part of the configuration service 220. The attribute management service 213 may allow attributes to be assigned to various assets (e.g., the machine instances 150) by a user 102, or by the computing resource service provider 199. Authorized parties such as the user 102 or the configuration service 220 acting on behalf of the user 102 may query the attribute management service 213 to determine that "tags" or other identifiers are assigned to one or more assets. For example, the configuration service 220 may obtain device configuration information 280 including a list of identifiers of machine instances operating within a VCE. The configuration service 220 may communicate the attribute management service 213 via any suitable communication protocol or interact with an application programming interface (API) of the attribute management service 213 to obtain the tags associated with each VM instance (or other assets).

For example, a user 102 may manually assign attributes indicating that a particular asset (e.g., a machine instance 150 or a datastore 160) is sensitive, mission-critical, or otherwise of greater importance by assigning one or more tags indicating that status for that asset (e.g., "sensitive," "high priority," "restricted," "redundant," "critical," "primary," "secondary," and so on) or other tags from which the user 102 or the configuration service 220 may use to classify assets. For instance, a user 102 may assign functional tags indicating functions performed by an asset ("production," "backup," "server," and so on). In some embodiments, the configuration service 220 may be configured to generate separate vulnerability reports for groups of assets sharing common tags. In other embodiments, the configuration service 220 may be configured to organize the vulnerability report 295 by grouping assets sharing common tags together and/or assigning a single priority indication for assets so grouped, or to assign an identical priority indication to all assets so grouped. In some embodiments, if the configuration service 220 cannot obtain information required to assign a recommended mitigation priority associated with an asset, the configuration service 220 may use tags included in the device attribute data 275 instead.

In some embodiments, the configuration analysis engine 225 uses resource accessibility data 285 determine which other resources and/or assets are coupled to (or may become coupled) to an asset such as one of the virtual machine instances 150 in order to determine priority indications in the vulnerability report 295. The configuration analysis engine 225 may then use resource sensitivity data 290 that identifies whether data stored by other resources or assets are sensitive data (or a degree of sensitivity of that data). In an example, VM instance 'A' (e.g., one of the instances 150) may be determined to have access to a datastore 'B' (e.g., one the datastores 160). If VM instance 'A' is compromised by exploitation of a vulnerability 'X', then data stored by datastore 'B' may be exposed. If the data stored by datastore B' are sensitive data (e.g., private or confidential data), then the configuration analysis engine 225 may determine that mitigation of vulnerability 'X' should be a higher priority relative to mitigation of other vulnerabilities.

In some embodiments, the configuration service 220 may obtain some or all of the device resource accessibility data 280 from an access policy analysis service 215 and/or a network access analysis service 217. These analysis services may be operated by the computing resource service provider 199 or a third party. In some such embodiments, one or both of the access policy analysis service 215 and the network access analysis service 217 may form a part of the configuration service 220. The access policy analysis service 215 may receive an access policy (e.g., the access policy 144) that controls access to resources associated with an account of a user (e.g., the user 102) and a computing environment of the user such as the VCE 140 and determine how many resources may be accessed by a particular asset or users of that asset.

An access policy analysis service such as the access policy analysis service 215 may generate comprehensive findings that identify resources that can be accessed from within a computing environment such as the VCE 140. The access policy analysis service 215 may accomplish this by evaluating access policies using mathematical logic and inference to determine the possible access paths allowed by the policies. The access policy analysis service 215 may continuously monitor for new or updated policies and analyze permissions granted using those policies that control access to resources such as datastores, cryptographic keys used for authentication and other purposes, and services which may be provided by the computing resource service provider 199 to assets and users within a VCE 140.

A network access analysis service such as the network access analysis service 217 may generate comprehensive findings that identify resources that can be accessed from within a computing environment such as the VCE 140. The network access analysis service 217 may accomplish this by analyzing network activity and applying machine learning algorithms or other suitable methods to determine which assets are reachable from other assets, other networks within an environment of a computing resource service provider (e.g., the environment 100 of the computing resource service provider 199). In some embodiments, the network access analysis service 217 may use automated theorem proving tools to identify network misconfigurations of security vulnerabilities that allow unintended to access to assets within a computing environment such as the VCE 140.

In some embodiments, the configuration service 220 may obtain some or all of the resource sensitivity data 290 from a data management service 219. The data management service 219 may be operated by a computing resource service provider 199 or a third party. In some such embodiments, the data management service 219 may form a part of the configuration service 220. The data management service 219 may use machine learning and pattern matching to discover and sensitive data and determine a degree of sensitivity of that data. The data management service 219 may automatically provide an inventory of datastores provided with a computing environment such as the environment 100 of the computing resource service provider 199 including a list of unencrypted datastores, publicly accessible datastores, and datastores shared with accounts associated with the computing resource service provider outside those defined by a user (e.g., the user 102) as belonging to, or associated with, the user. The data management service 219 applies machine learning and pattern matching techniques to datastores selected by the user identify and alert the user to the presence of potentially sensitive data, such as personally identifiable information (PII) or personal health information (PHI).

Figure 3:
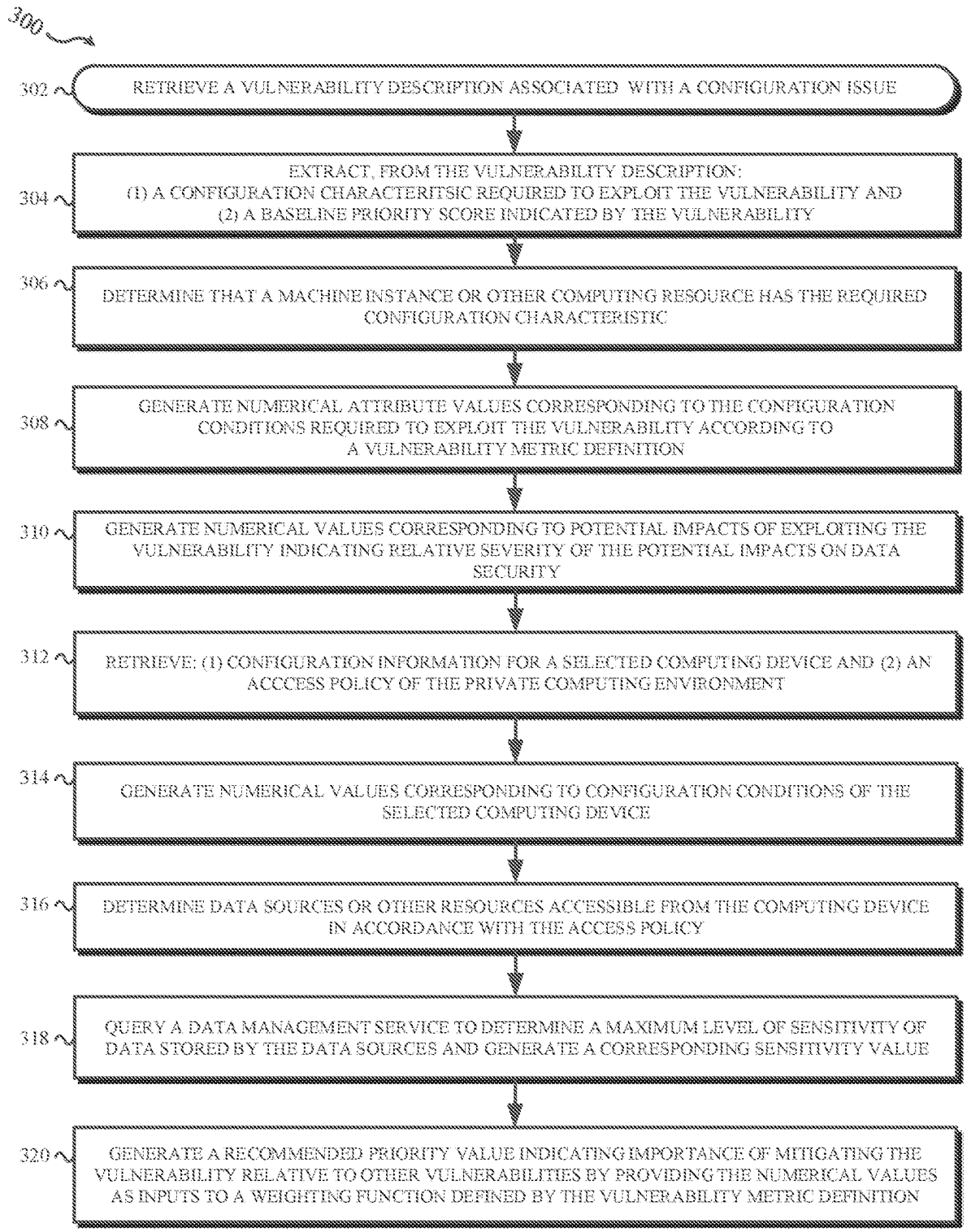
FIG. 3 is flowchart illustrating an example procedure performed in embodiments disclosed herein.

FIG. 3 is a flowchart illustrating an example process 300 which may be performed by a system to generate a vulnerability report (e.g., the vulnerability report 295). The process 300 has steps 302, 304, 306, 308, 310, 312, 314, 316, 318, and 320. In one example, the process 300 may be performed by a configuration service (e.g., the configuration service 120, or the configuration service 220), using a configuration analysis engine (e.g., the configuration analysis engine 125 or the configuration analysis engine 225). The process 300 may be applied to vulnerabilities associated with software package that may be installed on a susceptible device and to other vulnerabilities such as device configurations that deviate from best practices in variations applications related to the configuration of a device (e.g., a machine instance 150) or a virtual computing environment (e.g., a VCE 140).

The configuration service may be configured to receive requests to evaluate a configuration of a private computing environment of a user (e.g., the VCE 140 of the user 102). The request (or instruction) may be generated by the user via user interface (e.g., the use interface 108), or the request (or instruction) may be generated by the computing resource service provider (e.g., the computing resource service provider 199). In some embodiments, the system may be configured to repeatedly evaluate the private computing environment at predetermined times, or at predetermined intervals. In some embodiments, the system may be configured to evaluate the environment in response to receiving a notification, or otherwise detecting, that new information (e.g., vulnerability descriptions 230) has become available.

At step 302, the configuration service retrieves a vulnerability description associated with a configuration issue. The configuration may be a particular software package installed on a computing device or may be related to other configuration issues such as exposed networking ports, system privilege settings, and so forth As discussed above, a system may retrieve the description from a datastore (e.g., the datastore 130 storing vulnerability records) or using any suitable method such as retrieving vulnerability descriptions via an external service using an API call or network communication protocols including HTTP and FTP, as non-limiting examples.

At step 304, the configuration service extracts information from the vulnerability description. Specifically, the information includes (1) a configuration characteristic required to exploit the vulnerability and (2) a baseline priority score. In some embodiments, the baseline priority score may be calculated using subscores indicating characteristics of potential impacts of exploiting the vulnerability and/or conditions that enable exploiting the vulnerability. Examples of subscores include a subscore indicating a level of network access required to exploit the vulnerability (an "access subscore" or "network access subscore"), a subscore indicating a level of access privileges required to exploit the vulnerability (a "privilege subscore"), a subscore indicating that exploiting the vulnerability may allow privilege escalation (a "privilege escalation subscore") for applications to a level of access privileges above those defined by device configuration information of a machine instance or other resource (e.g., device configuration information 280 associated with a machine instance 150). These and other subscores may be included in the vulnerability description or extracted from it after parsing the vulnerability description. As one example, the vulnerability description may include qualitative description of the level of network access required, as shown in FIG. 6A and described further below. The configuration service may employ one or more lookup tables (e.g., the lookup table 700 of FIG. 7) which associate qualitative descriptors of various system attributes with numerical values in accordance with the vulnerability metric definition.

As an example, FIG. 6A, illustrating elements of an example VSS, shows "exploitability metrics" used to indicate require configuration conditions according to the example VSS. For instance, a software package may have a flaw which can only be exploited if a device (e.g., a machine instance 150) is configured to allow that package to be executed with the access privileges of an administrator account (as opposed to an ordinary user account) defined within the device. As another example, some vulnerabilities cannot be exploited unless a device allows the user to interact with the susceptible device (e.g., by responding to a dialog box or a textual prompt). As another example, some vulnerabilities require a particular degree of access to the susceptible device. As shown, in FIG. 6, the vulnerability metric definition employed by the example VSS distinguishes between whether a vulnerability requires physical access to the device, local access to the device (e.g., being logged in to the device as recognized user or a guest). Adjacent network access may refer to an exploit of the vulnerability requiring communicating directly with the machine via a network interface; in the context of a VCE 140 this may correspond another machine instance 150 within the VCE 140 communicating with the device being evaluated within the VCE 140). "Network" or "remote" access can include communicating with the device via the Internet or other public network outside the computing environment 100, without a requirement of being logged in or recognized by the device. For example, some vulnerabilities may be exploited by sending a malformed request to a web server application operating on a device using HTTP.

At step 306, the configuration service determines that a machine instance or other computing resource has the required configuration characteristic (in other words, that the vulnerability is relevant to the machine instance in light of its configuration and other data such as the data sources shown in FIG. 2).

At step 308, the configuration service uses the configuration analysis engine to generate numerical values corresponding to the configuration conditions required to exploit the vulnerability. These "exploitability" conditions may be used to indicate factors related to the relative difficulty or likelihood of a vulnerability being exploited. In order to systematically distinguish the difficulty of exploiting one vulnerability compared to the difficulty of exploiting another, a vulnerability metric definition such as that implemented by the example VSS of FIGS. 6A-6C may define rules for assigning numerical values between 0 and 10 or any other suitable numerical range to different configuration requirements. As non-limiting examples, the configuration analysis engine may determine a maximum level of privileges with which computing processes may be executed on a computing device, a level of network accessibility as described above, and so forth, Similarly, at step 310, the configuration service generates a numerical value corresponding to potential impacts of exploiting the vulnerability that indicates relative severity of the potential impacts on data security and other factors. For instance, the example VSS illustrated by FIGS. 6A-6C lists three "impact metrics." The confidentiality impact indicates whether exploiting a vulnerability may enable in unauthorized access to information stored by a device or accessible to it, under the assumption that such information is "confidential" (i.e., sensitive and requiring protection against unauthorized access). The example VSS defines three levels of impact ("none," "low," and "high"), though any suitable number of levels may be used in another suitable vulnerability metric. The example VSS also defines two further impact categories ("integrity impact," which indicates whether exploding a vulnerability may allow data to be altered, and if so whether data can be altered in deliberate manner to produce specific results such as overwriting a configuration file to reconfigure the device; and "availability impact" which indicates a degree to which exploiting a vulnerability may compromise a device's ability to function reliably or to deliver an expected level of performance). Although various explanations refer to the example VSS, it should be understood that embodiments herein may employ any suitable vulnerability metric definitions and that such metrics defining of categories and types of categories may be employed.

At step 312, the configuration service retrieves (1) configuration information (e.g., the device for a selected computing device and (2) an access policy (e.g., the access policy 144) associated with the private computing environment. The configuration information indicates that the device is configured to have the characteristics required to exploit that vulnerability or is capable of being reconfigured to have the characteristics required to exploit the vulnerability described by the vulnerability record retrieved at step 304. Generally, the access policy 144 specifies rules used by the computing resource service provider (e.g., the computing resource service provider 199) to control access to devices as well as to control those devices access to other computing resources (e.g., devices within the same computing environment, datastores, etc.), as contrasted with access privileges managed by the device to determine allowed and disallowed operations within the device (e.g., privileges of software applications to read and alter data stored within the device or managed by the device).

Figure 6B:
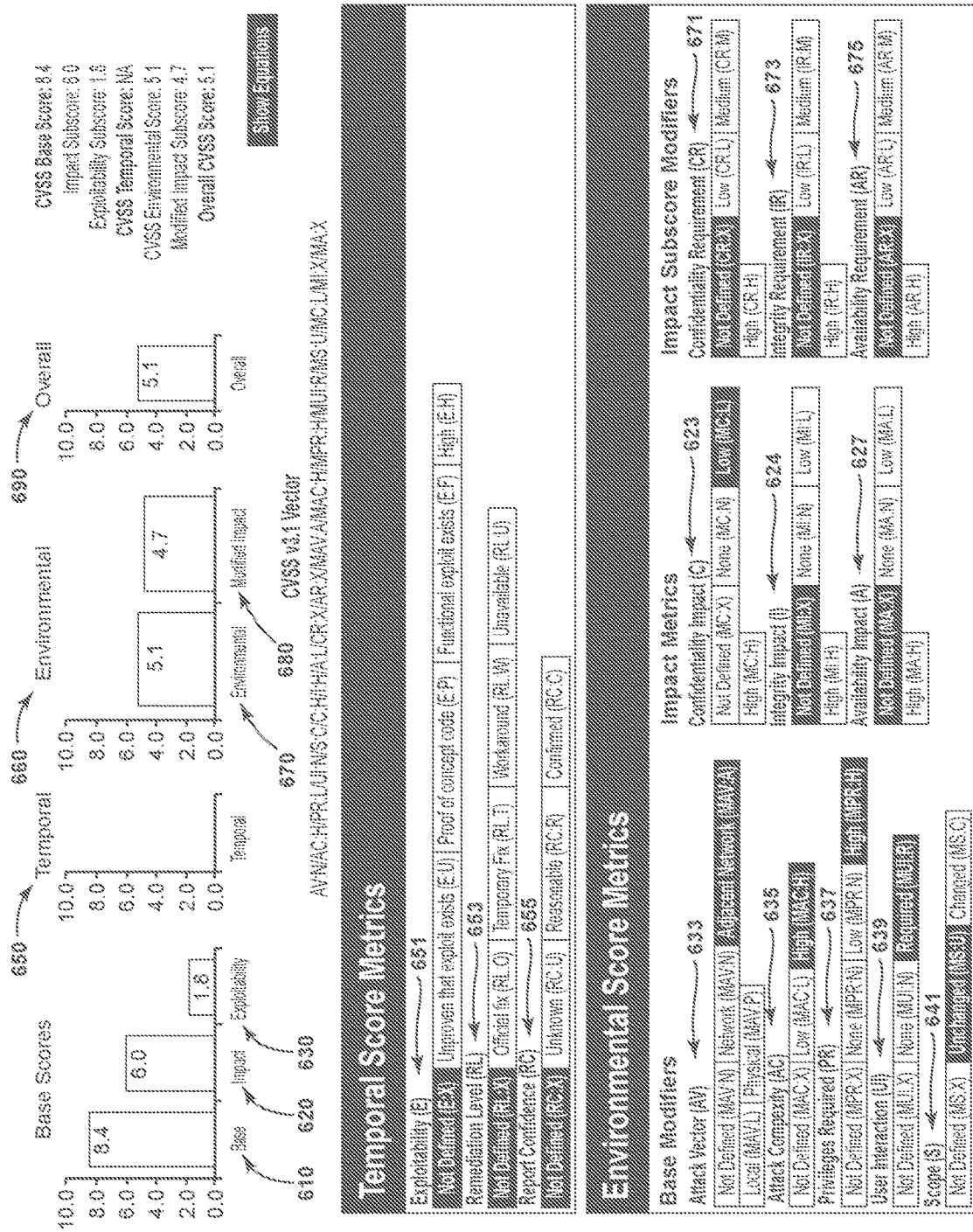
Figure 6C:
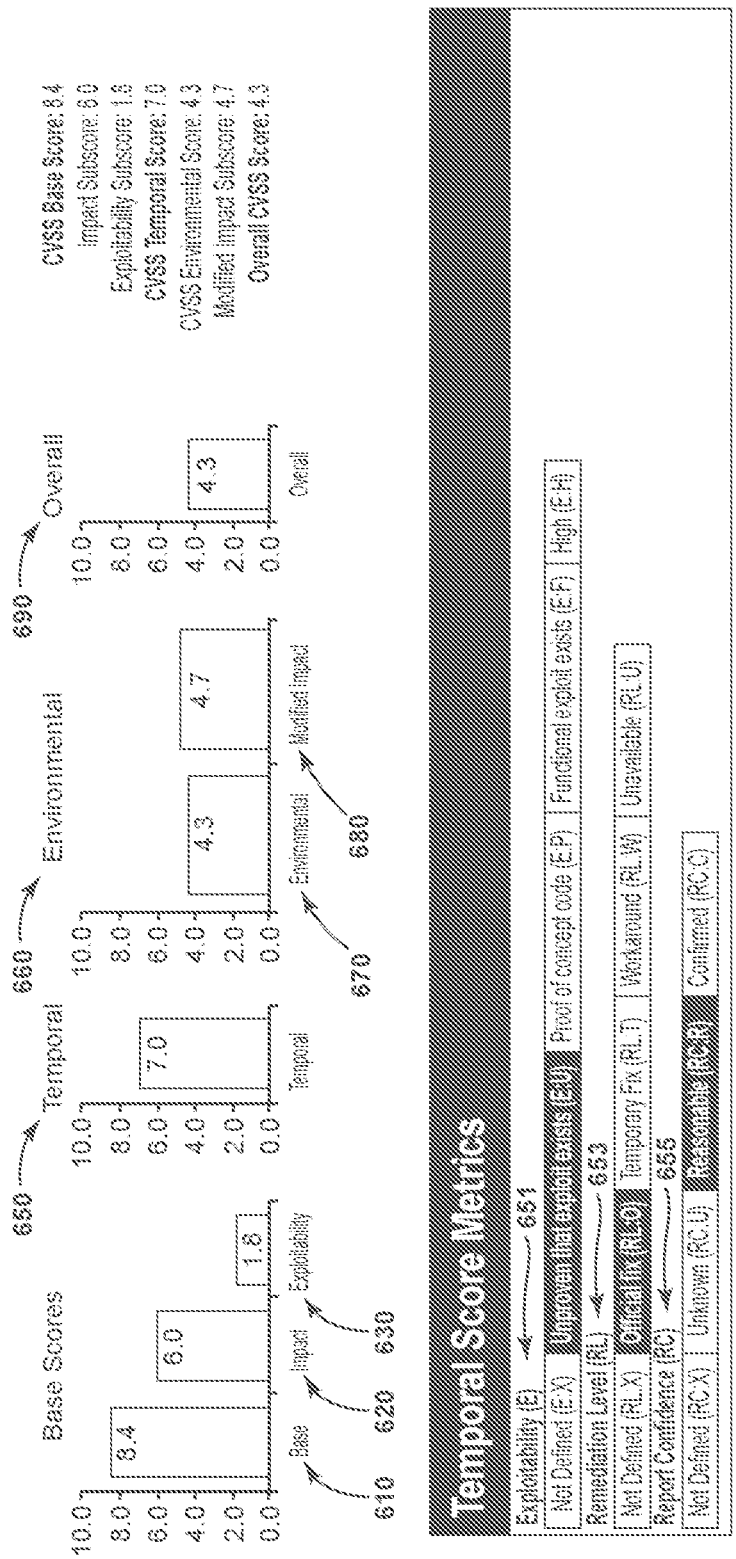

At step 314, the configuration analysis generates numerical values corresponding to configuration conditions of the selected computing device. Rules for assigning the values based on the particular condition may be defined by a vulnerability metric definition, of which the example VSS of FIGS. 6A-6C is a non-limiting example.

At step 316, the configuration service determines data sources or other resources accessible from the computing device in accordance with the access policy. For example, the access policy may define rules for whether one or more datastores may be accessed from the device (e.g., whether a particular VM instance 150 may access a particular datastore 160). The access policy may also define whether other resources may be accessed by a device, including, as a non-limiting example, other services offered by the computing resource service provider. For example, the computing resource service provider may offer standalone computing services configured to perform particular computational tasks (e.g., executing a specific function or program) on an as-requested basis and which may have access to user-owned or controlled datastores.

At step 318, the configuration service queries a data management service to determine a maximum level of sensitivity of data stored by the data sources (or accessible by the other resources) to generate a corresponding sensitivity value indicating whether the data sources stores sensitive information which should be protected against unauthorized access. The data management service may use machine learning algorithms and other methods to determine a sensitivity level of the data stored by various data sources. For example, the data management service may determine, based on file names, file contents, or other information (including, for example, "tags" assigned by the user, by a third party, or by the data management service 219) that a datastore contains personal health information (PHI) that may be subject to regulation or other sensitive information.

When a computing device (e.g., a machine instance 150) or other resource is configured to access multiple data sources, the configuration analysis engine may be configured to determine whether any of those data sources are sensitive and treat the device being evaluated as accessing sensitive data if any data source stores sensitive data. Alternatively, or in addition, the configuration analysis engine may be configured to associate a device with a level of data sensitivity corresponding to the most sensitive data accessible to the device across all data sources. The configuration analysis engine may be configured to convert one or more levels of data sensitivity into a data sensitivity score according to the vulnerability metric definition (e.g., using the example VSS described below in connection with FIGS. 6A-6C) using methods described herein or any other suitable method.

Finally, at step 320, the configuration service generates a recommended priority value indicating importance of mitigating the vulnerability relative to other vulnerabilities by providing the numerical values as inputs to any acceptable weighting function defined by the vulnerability metric definition. Details of an example weighting function are described further below in connection to FIGS. 6A-6C.

In some embodiments, a configuration service (e.g., the configuration service 120 or 220) may be configured to store first device configuration information (e.g., the device configuration information 280 or a portion thereof associated with a machine instance or other resource) as a first configuration of a device (e.g., a virtual machine instance 140, or "VMI") before generating a first vulnerability report. In such embodiments, the configuration service may retrieve second device configuration information associated with the VMI. The configuration service may be further configured to determine that second device configuration information differs from the first device configuration information, indicating that a configuration of the device has been modified. The configuration service may then reevaluate a vulnerability description with respect to the second device configuration information to generate an updated vulnerability score for the vulnerability and update a vulnerability report to associate the vulnerability with the updated vulnerability score.

As an example, the configuration service may retrieve a machine image or other device configuration information (e.g., by performing step 502 of the process 500 as described herein) used to instantiate or otherwise configure a VMI (e.g., a VMI 140). The configuration service may determine unique details characterizing the configuration of the VMI (e.g., a list of software packages 152 installed within the VMI, including version numbers; a list of network ports that are open, etc.) The configuration service may store this information or information derived from it for use as "snapshot" or "fingerprint" (e.g., a hash value) of the current to identify the configuration of the VMI at a first point in time. At a later point in time, the configuration system may receive (or retrieve) the device configuration or similar information again and determine by performing a direct comparison or comparing the first snapshot (or fingerprint) to a new snapshot (e.g., the configuration service may perform step 506 of the process 500 as described further below in connection with FIG. 5). If the snapshots are different, the configuration service may generate a new vulnerability report or update an existing vulnerability report (e.g., the vulnerability report 295), performing steps 508-514 of the process 500, as an example, as described further below in connection with FIG. 5.

Figure 4:
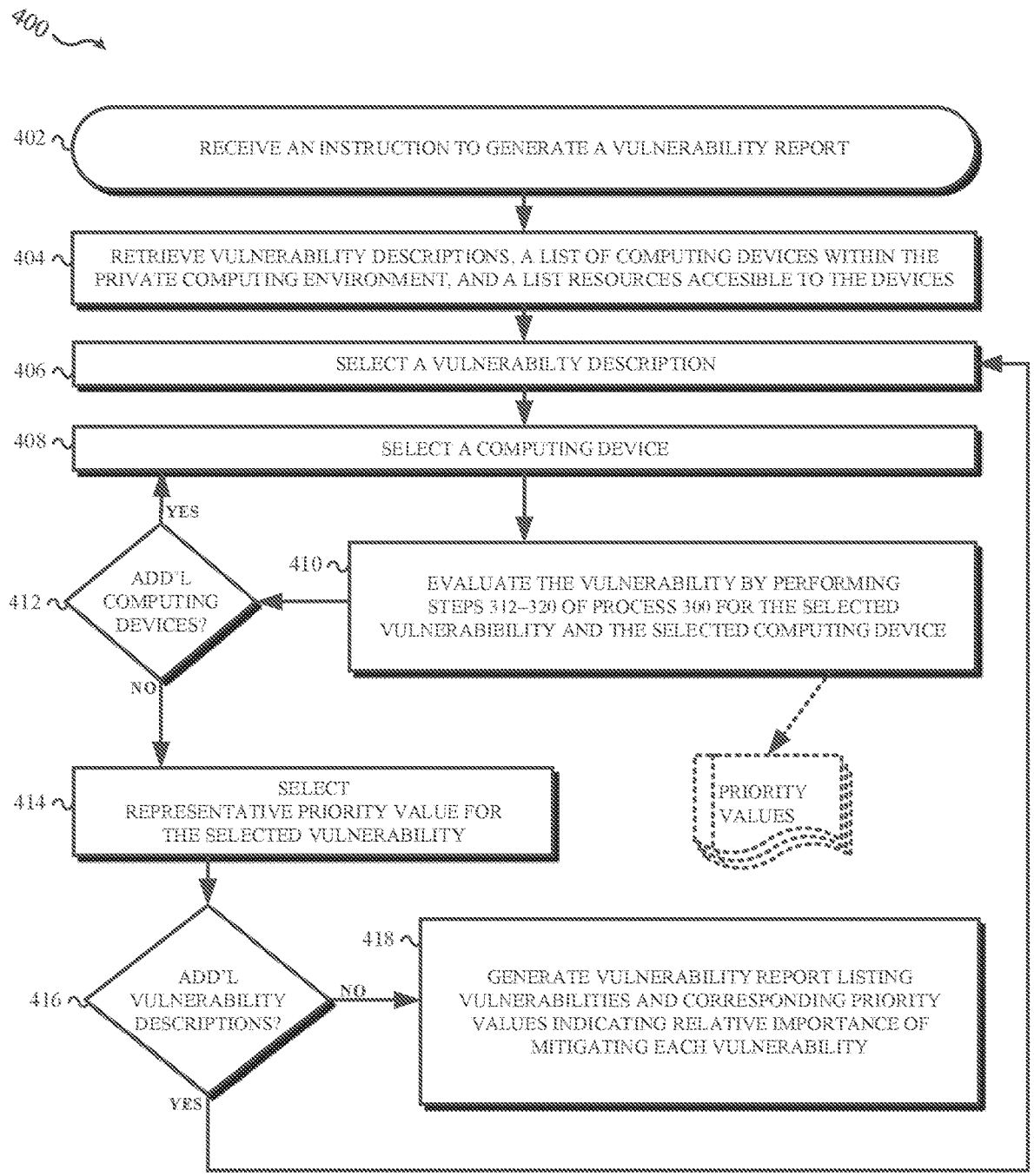
FIG. 4 is flowchart illustrating an example procedure incorporating elements of the example procedure of FIG. 3 performed in embodiments disclosed herein.

FIG. 4 is a flowchart illustrating an example process 400 which may be performed by a system to generate a vulnerability report (e.g., the vulnerability report 295) after individually evaluating multiple vulnerabilities with respect to one or more devices. The process 400 has steps 402, 404, 406, 408, 410, 412, 414, 416, and 418. Performing the process 400 includes performing certain steps of the process 300, described above in connection with FIG. 3, as will be explained below. In one example, the process 400 may be performed by a configuration service (e.g., the configuration service 120, or e.g., the configuration service 220), using a configuration analysis engine (e.g., the configuration analysis engine 125 or the configuration analysis engine 225).

At step 402, the configuration service receives an instruction (or a request) to generate a vulnerability report (e.g., the vulnerability report 295) related to a configuration of a private computing environment of a user (e.g., the VCE 140 of the user 102) provided by a computing resource service provider. In some embodiments the system may be configured to repeatedly evaluate the configuration of the private computing environment at predetermined times, or at predetermined intervals. In some embodiments, the system may be configured to evaluate the environment in response to receiving a notification, or otherwise detecting, that new information (e.g., new or updated vulnerability descriptions 230) has become available.

At step 404, configuration service retrieves vulnerability descriptions, a list of computing devices within the private computing environment, and a list resources accessible to the computing devices. The configuration service may retrieve the vulnerability descriptions from a datastore (e.g., the datastore 130 storing vulnerability records) or another source uses any suitable methods, including those described in connection with FIGS. 1-3). The list of computing devices may be obtained from account information of the user stored by the computing resource service provider and associated with the private computing environment (e.g., the account information 142). The list of resources accessible to the computing devices may be determined using a resources and associated access permission for those resources defined by an access policy (e.g., the access policy 144) or by any other suitable methods.

At step 406, the configuration service selects a vulnerability description from a list of vulnerability descriptions available to be evaluated and proceeds to step 408.

At step 408, the configuration service selects a computing device from the list of computing devices and proceeds to perform steps 410-416 as described further below. Once the selected vulnerability has been analyzed, the configuration service may return to step 408, as described further below.

At step 410, the configuration service, using the configuration analysis engine, performs steps 312-320 of the process 300 described above for the computing device selected at step 408. The configuration analysis engine outputs the priority value generated at step 320 of the process 300).

At step 412, the configuration service determines whether additional computing devices from the list of computing devices remain. If additional devices remain, the configuration service returns to step 408 and selects another computing device and begins evaluates the vulnerability selected at step 406 by proceeding to step 410. If no additional computing devices remain, the configuration service proceeds instead to step 414.

At step 414, the configuration service uses the configuration analysis engine to select (or generate) a representative priority value that indicates an aggregate priority score for the selected vulnerability with respect to all relevant computing devices. In some embodiments, the configuration analysis engine may select the highest priority score generated for the selected vulnerabilities. In other embodiments, the configuration analysis engine may generate an arithmetic mean, a geometric mean, or any other suitable measure that combines all the priority scores into a single score. Having completed evaluating the selected priority with respect to multiple computing devices, the configuration service proceeds to step 416.

At step 416, the configuration service determines whether additional vulnerability descriptions remain that require evaluation. If additional vulnerability descriptions remain, the configuration service returns to step 406 where the configuration service selects another of the vulnerability records and then proceeds to perform steps 408-414 for the newly-selected vulnerability description. If no vulnerability descriptions remain to be evaluated, the configuration service proceeds to step 418.

Finally, at step 418, the configuration service generates a vulnerability report listing the vulnerabilities corresponding to each vulnerability description and the corresponding representative priority values indicating relative importance of mitigating each vulnerability. In some embodiments, the configuration service may omit vulnerabilities having scores above or below a predetermined threshold from the vulnerability report.

As described above, the process 400 iteratively generates priority values by first selecting a vulnerability, and then iterating over all listed computing devices to generate a vulnerability report that assigns priorities to vulnerabilities. However, it will be understood that the process 400 may be modified to generate a vulnerability report that instead prioritizes computing devices by first selecting a computing device (i.e., reversing the orders of steps 406 and 408, and exchanging steps 412 and 416), and then iterating over all available vulnerabilities with respect to that computing device. Alternatively, in some embodiments, the process 400 may be modified to store the priority value for each combination of a unique vulnerability description and a unique computing device such that the configuration service may generate a vulnerability report that organizes priorities by either vulnerability or by computing device. In some such embodiments, the configuration service may be configured to produce both types of vulnerability report or a hybrid report that contains both types of prioritization.

Figure 5:
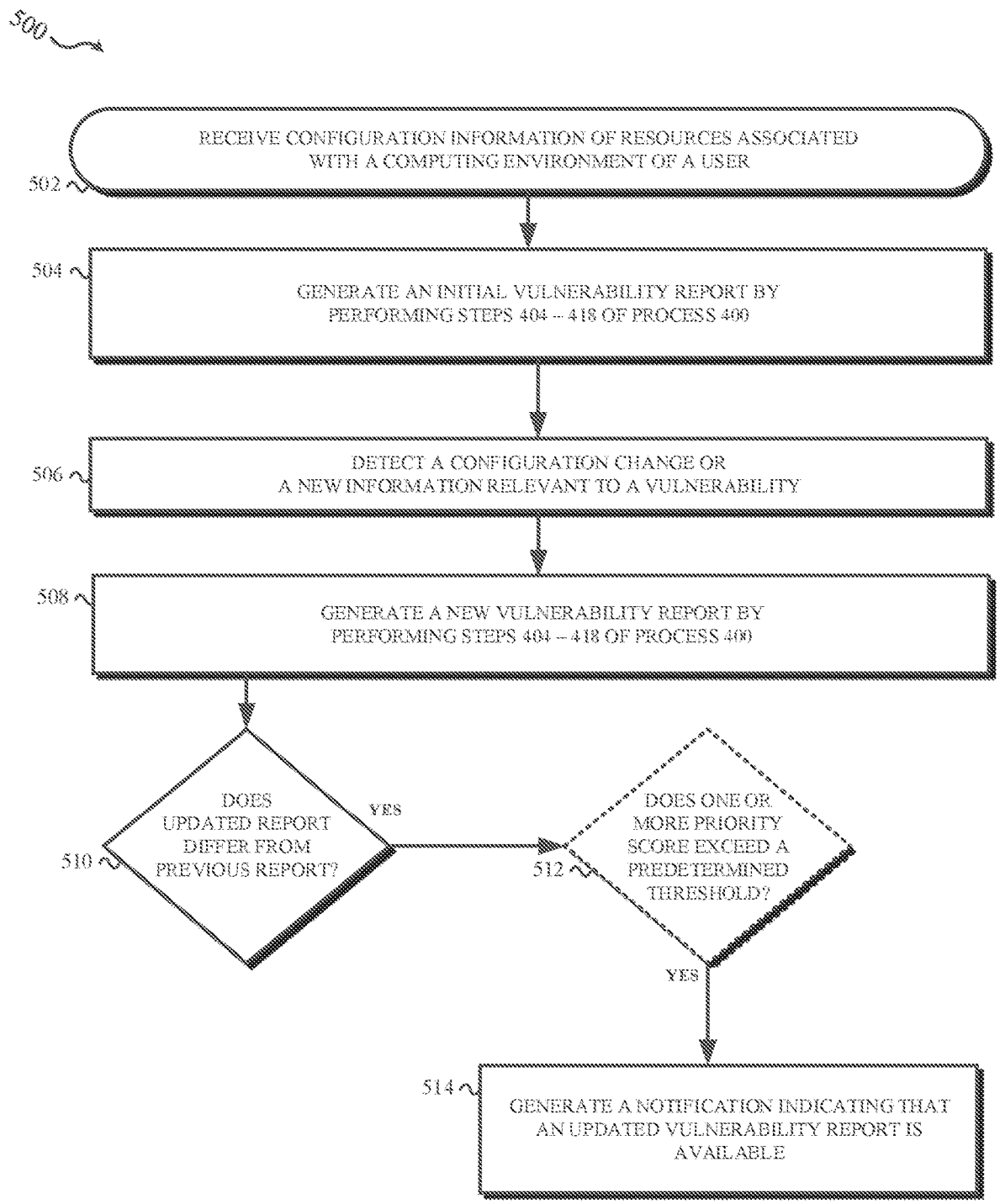
FIG. 5 is flowchart illustrating an example procedure incorporating elements of the example procedure of FIG. 4 performed in embodiments disclosed herein.

FIG. 5 is a flowchart illustrating an example process 500 which may be performed by a system to generate a vulnerability report (e.g., the vulnerability report 295) after individually evaluating multiple vulnerabilities with respect to one or more devices and update that report in response to detecting new vulnerability descriptions or changing device configurations. The process 500 has steps 502, 504, 506, 508, step 510, optional step 512, and step 514. Performing the process 500 includes performing certain steps of the process 400 (which in turn includes performing steps of the process 300), described above in connection to FIGS. 3-4, as explained below. In one example, the process 500 may be performed by a configuration service (e.g., the configuration service 120, or e.g., the configuration service 220), using a configuration analysis engine (e.g., the configuration analysis engine 125 or the configuration analysis engine 225).

At step 502, the configuration service receives configuration information of resources associated with a computing environment of a user (e.g., the account information 142, the device configuration information 280 of individual devices, and/or other information described herein in connection with FIG. 2 and elsewhere).

At step 504, the configuration service uses the configuration analysis engine to generate an initial vulnerability report by performing steps 404-418 of the process 400.

At step 506, the configuration service detects either that the configuration of a device or resource evaluated at step 504 has changed or that new (or updated vulnerability description is has been received or has been made available) and proceeds to step 508.

At step 508, the configuration service optionally determines whether one or more of the priority scores in the updated vulnerability report.

At step 510, the configuration service determines whether the updated vulnerability report differs from the vulnerability report generated at step 504. If the new report generated at step 508 differs, configuration service proceeds to step 512.

At step 512, the configuration service optionally determines whether one or more priority scores in the new report exceed a threshold and proceeds to step 514 if the answer is yes. For example, in some embodiments, the configuration service may not immediately notify a user if the report differs from a previous report if the differences are deemed insignificant. Similarly, even if a new vulnerability is evaluated, its priority score may not be sufficiently high to warrant notifying the user immediately.

Finally, at step 514, the configuration service generates a notification that an updated vulnerability report is available. In some embodiments, the configuration service may additionally (or alternatively) generate a specific notification indicating that the priority score for a particular vulnerability has changed or that a new vulnerability has been evaluated and has received a priority score.

FIGS. 6A-6C illustrate elements of a vulnerability metric defined by an example VSS in the form of a VSS calculator. It should be understood that descriptions of the VSS is for purposes of illustration only and that embodiments may implement any suitable vulnerability metric as described herein.

FIG. 6A illustrates calculating a baseline priority score (i.e., a "base score" such as the base score 610) generated according to a vulnerability metric definition provided by an example VSS. The base score 610 of FIG. 6A is determined using the base impact score 620 and the base exploitability the base exploitability score 630. The base exploitability score 630 includes metrics related to attributes of device configuration characteristics required to exploit a vulnerability on a particular device. The base exploitability score metric depends on several attributes of a device's configuration with relation to how the vulnerability may be exploited. The values displayed in FIG. 6A correspond to an example vulnerability assigned various qualitative values which are converted into numerical values and weighted according to the example VSS vulnerability metric definition and the weighting function(s) described herein. As shown, an example vulnerability receives a priority score of 8.4/10 (i.e., the base score 610). This baseline priority score may be determined by a weighted combination of factors as described below, using values assigned using the lookup table 700 of FIG. 7. Some embodiments may use a VSS that omits attributes described in connection with the example VSS, add attributes, or calculate scores differently, according to any suitable vulnerability metric definition.

The attack vector attribute 632 specifies a minimum level of network access to the device required to exploit the vulnerability. The "lowest" level is remote access, referred to as "network" and equivalent to accessing the device via the Internet or other public network. The "adjacent network" attribute indicates that the vulnerability may be exploited as long as an attacker can at least access the device via its network interface. "Local" indicates that the ability to access the system directly (e.g., as an authored user) is required. Finally "physical" indicates that hardware of the device must be accessible to manipulation.

The privileges required attribute 636 and associated attribute values describe a qualitative level of permissions or other privileges required to exploit the vulnerability. For example, in a UNIX-like computing system, "high" privileges might correspond to an administrator or root-level account, whereas "low" privileges might correspond to an ordinary user account where the system is configured to prevent the user from accessing information outside a limited domain (such as "home" directory) and is configured to prevent that user from making system-wide configuration changes.

Additional characteristics forming the base exploitability score 630 and related attributes indicate characteristics of the exploit itself, i.e., whether a user must interact with the system for the vulnerability to be exploited (e.g., opening an e-mail, executing a compromised application executable, etc. as represented by the user interaction attribute 638); and whether a successful exploit may enable an escalation of access privileges (the base scope attribute 640). In the example VSS, the base scope attribute 640 may be treated separately, as shown in FIG. 6A.

It will be understood that not all vulnerabilities will be relevant to all devices. For example, if a vulnerability requires that a device have a network interface and a device being evaluated with respect to that vulnerability does not have a network interface, they vulnerability is not relevant to that device. However, if a device has the required characteristics, even if the attributes for the vulnerability to be exploited differ from the device's attributes, a base exploitability score can be calculated. As shown, the example VSS defines an attack vector attribute which qualitatively describes a level of access to the device required to exploit a vulnerability.

The base impact score 620 depends on an additional subscore called the impact subscore (ISS) which is defined by the example VSS using numerical values for the attributes shown in FIG. 6A by the following equation:

$$ISS = 1 - [(1-C)*(1-I)*(1-A)] \quad [\text{Eq. 1}]$$

where the variables 'C,' 'I,' and 'A' are "Confidentiality," "Integrity," and "Availability" attribute values corresponding to the confidentiality impact attribute 622, the integrity impact attribute 624, and the availability impact attribute 626 shown in FIG. 6A. These factors represent potential impacts of a successful exploit such as granted access to protected data which may include confidential information such as customer data or other sensitive information. For purposes of interpreting a generic vulnerability description, it may be assumed that all data stored or accessible by a system is confidential or otherwise sensitive. Values may be assigned to the various attributes using the lookup table 700 of FIG. 7.

The base impact score 620 is assigned a value according to one of two equations depending on whether exploiting the vulnerability allows a change in scope (e.g., a privilege escalation that allows privileges with which various computing processes are executed to be increased over the normal privileges allowed by the device configuration as a result of exploiting the vulnerability), as indicated by) is assigned a value according to one of two equations depending on whether exploiting the vulnerability allows a change in scope (e.g., a privilege escalation that allows privileges with which various computing processes are executed to be increased over the normal privileges allowed by the device configuration as a result of exploiting the vulnerability), as indicated by( ) is assigned a value according to one of two equations depending on whether exploiting the vulnerability allows a change in scope (e.g., a privilege escalation that allows privileges with which various computing processes are executed to be increased over the normal privileges allowed by the device configuration as a result of exploiting the vulnerability), as indicated by the base scope attribute 640 (scope$_{base}$) according to the following equations:

$$\text{Impact}_{Base} = 6.42*(ISS) \text{ if } \text{Scope}_{Base}=\text{'unchanged'}. \quad [\text{Eq. 2A}]$$

$$\text{Impact}_{Base} = 7.52*(ISS-0.029) - 3.25*(ISS-0.02)^{15} \text{ if } \text{Scope}_{base}=\text{'changed'}. \quad [\text{Eq. 2B}]$$

The base exploitability score 630 (i.e., Exploitability$_{base}$ in Eq. 3 below) is calculated using the following equation and numerical values assigned for the attributes shown in FIG. 6A. The vulnerability metric definition specified by the example VSS assigns a value between to each possible qualitative attribute descriptor shown in FIGS. below) is calculated using the following equation and numerical values assigned for the attributes shown in FIG. 6A. The vulnerability metric definition specified by the example VSS assigns a value between to each possible qualitative attribute descriptor shown in FIGS. 6A-6C.

$$\text{Exploitability}_{base} = 8.22* (AV_{base}*AC_{base}*PR_{Base}*UI_{Base}) \quad [\text{Eq. 3}]$$

where {AV$_{base}$, AC$_{base}$, PR$_{base}$, UI$_{base}$} correspond, respectively, to the attack vector attribute 632, the attack complexity attribute 634, the privileges required attribute 636 and the user interaction attribute 638. In both instances, the example VSS defines a lookup table (e.g., the lookup table 700 of FIG. 7) specifying how the qualitative assessment options shown in FIG. 6A are to be mapped to numerical values. Embodiments herein may use the vulnerability metric definition of the example VSS, modifications to that metric, or any other suitable metrics.

The baseline priority score (the base score 610), i.e. Score$_{Base}$, in the equations to follow) is given by one of the following equations if the impact score is >0 (in which case the base score is also zero), rounded upward to the nearest tenth: in the equations to follow) is given by one of the following equations if the impact score is >0 (in which case the base score is also zero), rounded upward to the nearest tenth:

$$\text{Score}_{Base} = \text{Min}([\text{Impact}_{Base} + \text{Exploitability}_{Base}], 10) \text{ if } \text{Scope}_{Base}=\text{'unchanged'} \quad [\text{Eq. 4A}]$$

$$\text{Score}_{Base} = \text{Min}((1.08*[\text{BImpact}_{Base} + \text{Exploitability}_{Base}], 10)) \text{ if } \text{Scope}_{Base}=\text{'changed'} \quad [\text{Eq. 4B}]$$

Typically, a vulnerability description will contain a base score that reflects the risk in general terms that cannot account for specific configuration details of an actual computing device, as illustrated in FIG. 6A. As shown in FIG. 6B, the example VSS allows the base score to be modified for the particular configuration of a system or device being evaluated. FIG. 6B shows the same base score 610 for the example vulnerability of FIG. 6A. However, in FIG. 6B additional "environmental" metrics have been applied that account for differences between the required configurations attributes to exploit the vulnerability and the configuration of a particular system, resulted in an adjusted value for the vulnerability priority (e.g., the overall score 690). Notably, there is a one-to-one correspondence (though there need not be in other acceptable vulnerability metric definitions) between the configuration characteristics and their attributes between the base score and the environmental score.

According to the example VSS, the vulnerability score (e.g., the overall score 690) may be calculated by using the formulas below which have "modified" values (denoted by the subscript 'Mod') analogous to the values used to calculate the baseline priority score. The modified environmental base score (e.g., the environmental score 670), Scope Mod is given by:

$$\text{Score}_{Mod} = \text{Min}([\text{Impact}_{Mod} + \text{Exploitability}_{Mod}], 10) \quad [\text{Eq. 5}]$$

where {Impact$_{Mod}$, Exploitability$_{Mod}$} are, respectively, the environmental score (e.g., the environmental score 670) and the modified (environmental) impact score (e.g., the modified impact score 680). The modified impact score depends upon a modified impact subscore (MISS) determined by applying weighting factors {C$_{Mod}$, I$_{Mod}$, A$_{Mod}$}, corresponding, respectively, to the confidentiality requirement 671, the integrity requirement 673, and the availability requirement 675. These requirement modifiers are assigned in the interval {0, 1} according to the vulnerability metric definition (using, for example, the lookup table 700 of FIG. 7). These requirement modifiers account for the fact that that an exploited vulnerability which exposes data may not be a high priority if maintaining confidentiality of data is not a requirement for that system. Similarly, the availability requirement and integrity requirement modifiers account for systems where high availability (e.g., "uptime") and integrity (e.g., data consistency) are not required.

The MISS depends on the same attribute values as the ISS, modified by the values of the additional weighting factors:

$$\text{MISS}=1-[(1-C^*C_{Mod})^*(1-I^*I_{Mod})^*(1-A^*A_{Mod})] \text{ or } 0.915 \text{ if result}<0.915 \quad \text{[Eq. 6]}$$

$$\text{impact}_{Mod}=6.42^*(\text{MISS}) \text{ if Scope}_{Mod}=\text{'unchanged'}. \quad \text{[Eq. 7A]}$$

$$\text{impact}_{Mod}=7.52^*(\text{MISS}-0.029)-3.25^*(0.9731^*\text{MISS}-0.02)^{13} \text{ if Scope}_{Mod}=\text{'changed'} \quad \text{[Eq. 7B]}$$

$$\text{Exploitability}_{Mod}=8.22^*(AV_{mod}^*AC_{mod}^*PR_{mod}^*UI_{mod}) \quad \text{[Eq.8]}$$

The differences between the generic vulnerability attributes (e.g., information extracted from a vulnerability description at step 304 of the process 300) and those of the vulnerability with respect to the system being evaluated (e.g., values generated at step 314 of the process 300 using information retrieved at step 312 of the process 300) influence the priority score specific to the particular combination of the vulnerability with a particular device. In this instance, the baseline priority score (the base score 610) is 8.4/10 but the subsequent vulnerability priority score (the overall score 690) is 5.1/10 after system-specific factors are accounted for. This is because, in this particular example, the system-specific attributes entered mitigate the potential severity of the impacts and also increase the required attributes for a successful exploit.

The impacts shown in FIG. 6A include a change in scope as indicated by the base scope attribute 640 (Scope$_{base}$, in the preceding equations), a high degree of exposure of potentially confidential information indicated by the confidentiality impact attribute 622, and high impact on the integrity of the system as indicated by the integrity impact attribute 624 (i.e., its ability to perform as originally configured and/or to preserve the contents of stored data). However, when the vulnerability is evaluated for the particular system, the system configuration prevents a network attack from succeeding and now requires adjacent network access instead. The required privileges are now (relatively) "high" instead of (relatively) "low" and the modified confidentiality impact is now "low." Although a user may manually guess at appropriate temporal and environmental modifiers, doing so is time consuming, prone to error, and unlikely to yield actionable priorities that make the best use of time and resources available for remediating configuration problems.

Specifically, the modified (environmental) attributes shown in FIG. 6B indicate an adjacent network value for the modified attack vector attribute 633 ("MAV"), a high minimum level of privileges required for the modified privilege required attribute 637 ("MPR"), and user interaction required for the modified user interaction attribute 639 (MUI). Using the vulnerability metric of the example VS S (or any suitable vulnerability metric), a configuration service (e.g., the configuration service 120 or 220) can covert these attribute values to numerical values as specified by the lookup table 700 of FIG. 7). For instance, the lookup table 700 determines the following set of numerical values for the three attributes described: {MAV, MPR, MUI}→{0.62, 0.27, 0.62}). By comparison the corresponding base attribute values shown in FIG. 6A are assigned the values {0.85, 0.27, 0.85} according to the lookup table 700 of FIG. 7.

Embodiments disclosed herein allow these mitigated or exacerbated circumstance to be determined systematically and as they apply to complex cloud-based environments (e.g., the computing environment 100 and VCEs). For instance a configuration service (e.g., the configuration service 120 or 220) may determine either that a system had additional safeguards against exposure of confidential information or that a system simply does not have access to confidential information. For example, as described herein, a configuration system may use sensitivity data (e.g., the resource sensitivity data 290) to determine that datastores or other resources accessed by a system do or do not contain sensitive information and may also characterize data by a level of data sensitivity (e.g., "sensitive," "highly sensitive," and the like) by querying a data management service as described above (e.g., performing steps 316 and 318 of the process 300 described in connection with FIG. 3). Similarly, embodiments disclosed herein may be used to systematically determine a level of network access permitted to a device and determine, as one example, whether that device may be accessed via a public network. If not, the baseline attack vector attribute score (or another similar score) may be modified, as shown in FIG. 6B. Embodiments herein may use any suitable vulnerability metric description, including the example VSS, as a nonlimiting example to determine weightings of attributes shown in FIGS. 6A-6C, attributes described herein and any other suitable configuration attributes.

In the example VSS and other vulnerability metrics a baseline priority score may also be modified using other qualitative characteristics, such as the "temporal" attributes which generally describe additional factors affecting the likelihood of a vulnerability being exploited and the likelihood of mitigating the vulnerability. In FIG. 6B the temporal attributes specified by the example VSS are undefined to show the effect of environmental attributes alone, without the impact of any temporal attributes. FIG. 6C illustrates these temporal attributes and how they may affect a baseline priority score. In FIG. 6C, assessments indicating uncertainty that a practical exploit exists for the vulnerability, the existence a fix for the vulnerability (e.g., a software patch or recommended configuration modification), and so on further reduce the earlier modified priority score from 5.1/10 to 4.3/10. By this example it will be understand that an "urgent" vulnerability for one system may be less urgent for another and vice versa and that embodiments disclosed herein enable automated generation of customized reports that prioritize vulnerabilities for mitigation while accounting for the unique configuration of assets in a user's computing environment.

The temporal modifiers in the example VSS shown in FIG. 6C may be combined into a temporal score (Score$_{Temporal}$), where the variables {E, RL, RC} correspond, respectively, to the temporal exploitability attribute 651, the remediation level attribute 653, and the report confidence attribute 655. These attributes indicate whether (and to what extent) exploits may exist for the vulnerability, whether (and to what extent) the vulnerability can be remediated, and a degree of confidence in the accuracy or applicability of the vulnerability description. The temporal score is given by the following equation, rounded to the nearest tenth:

$$\text{Score}_{Temporal}=\text{Score}_{base}^*(E^*RL^*RC) \quad \text{[Eq. 9]}$$

When temporal factors are considered, the temporal modifiers are also applied to weight the MISS such that:

$$\text{MISS}\rightarrow\text{MISS}^*(E^*RL^*RC) \quad \text{[Eq. 10]}$$

It will be understood that qualitative attributes including degrees or levels of network access, degrees or levels of network access, degrees or levels of privilege and so on may be converted to numerical values as appropriate in order to determine appropriate weighting factors to be applied to the baseline priority score and subscores as appropriate. Thus a level of network access allowed for a device may be converted to an appropriate score (a "system access score"), a level of data sensitivity may be similarly converted to an appropriate score (a "data sensitivity score"), and a level of access privileges allowed by the configuration of a device may also be converted to an appropriate score (a "system privilege score"). In some embodiments, calculating the environmental scores (e.g., the environmental score 670, referred to in the preceding equations as $Score_{Mod}$, the modified impact score 680, referred to in the preceding equations as $impact_{Mod}$, and temporal scores (e.g., the temporal score 650, referred to in the preceding equations as $Score_{Temporal}$) as described above, or performing similar calculations may be performed as part of step 314 of the process 300, described above in connection with FIG. 3.

FIG. 7 shows an example lookup example table 700 that may be used to assign values to vulnerability attributes and system-specific attributes as part of the vulnerability metric definition of the example VSS illustrated by FIGS. 6A-6C. In embodiments herein, a configuration service (e.g., the configuration service 120 or 220) may use the table of FIG. 7 as described above to use various scores and subscores disclosed herein as appropriate inputs to a weighting algorithm (or "weighting function") such as that implemented by the example VSS. In some embodiments, scores produced by other systems or services may be used to determine the appropriate attribute value of an attribute specified by the VSS. For example, a threat score as described above may be used to determine an appropriate attribute value for the report confidence attribute 655 or the temporal exploitability attribute 651.

In some embodiments the configuration service may determine (or extract) from the vulnerability description (e.g., one of the vulnerability descriptions 230) a minimum level of network access required to exploit a vulnerability and convert it to a value of the attack vector attribute 632 to a corresponding baseline access score (i.e., $AV_{Base}$ as described above). The configuration service may also determine a maximum level of network access allowed to the resource by the private computing environment and convert that level of network access to a system access score that serves as an appropriate environmental modifier (e.g., the modified attack vector attribute 633, i.e., $AV_{Mod}$, discussed above in connection with FIG. 6B) according to the lookup table 700 of FIG. 7. When the level of network access required to exploit the vulnerability is higher than the level of access permitted by the private computing environment to the resource, providing the baseline access score and the system access score may have the effect of reducing the vulnerability priority score relative to the baseline priority score indicated by the vulnerability description.

In some embodiments, the configuration service may determine (or extract) from the vulnerability description (e.g., one of the vulnerability descriptions 230) a minimum privilege level required to exploit the vulnerability and convert it to a value of the "privileges required" attribute to a corresponding baseline privilege score (e.g., the privileges required attribute 636, or $PR_{Base}$, as described above). The configuration service may also determine a maximum level of privileges by the resource using configuration information associated with the resource (e.g., all or part of the device configuration information 280) convert that level of privileges to a system privilege score that serves as an appropriate environmental modifier (e.g., the modified privileges required attribute 637 of FIG. 6B, or $PR_{Mod}$) according to the table of FIG. 7. When the level of privileges required to exploit the vulnerability is higher than the level of privileges permitted by the resource, providing the baseline privilege score and the system privilege score (e.g., the modified privileges required attribute 637) may have the effect of reducing the vulnerability priority score relative to the baseline priority score indicated by the vulnerability description. Conversely, when the configuration of the device enables the vulnerability to be exploited with a lower privilege level than described in the vulnerability description, providing the baseline privilege score and the system privilege score to the weighting function may have the effect of increasing the vulnerability priority score relative to the baseline priority score indicated by the vulnerability description.

In some embodiments (e.g., as part of performing steps 316-318 of the process 300 described in connection with FIG. 3), the configuration service may determine a maximum level of data sensitivity of data accessible from the resource and convert that level of data sensitivity to a data sensitivity score that serves as an appropriate environmental modifier value (e.g., the confidentiality requirement 671, or $C_{Mod}$, discussed above in connection with FIG. 6B, and/or the modified confidentiality impact attribute 623 of FIG. 6B) according to the lookup table 700 of FIG. 7. When the vulnerability description indicates that exploiting the vulnerability may allow unauthorized access to information, but the level of data sensitivity indicates that the device cannot access sensitive data, providing the data sensitivity score may have the effect of reducing the vulnerability priority score relative to the baseline priority score indicated by the vulnerability description.

In some embodiments, the configuration service may determine that the vulnerability description indicates that exploiting the vulnerability may result in a privilege escalation or other change of access scope (e.g., based on the base scope attribute 640 of FIG. 6A, i.e., $Scope_{base}$). For example, the configuration service may parse a vulnerability description (e.g., one of the vulnerability descriptions 230) to extract an indication that the vulnerability allows a privilege escalation and assign a numerical value to that indication according a vulnerability metric definition such as the metric defined by the example VSS (e.g., by using the lookup table 700 of FIG. 7).

In such embodiments the configuration service may determine whether the configuration of the device allows the potential scope change to be realized and generate a privilege escalation score for use an appropriate environmental modifier (e.g., the modified scope attribute 641 of FIG. 6B, i.e., scope mod) having a value assigned according to the lookup table 700 of FIG. 7 or a similar lookup table. The configuration service may also determine that the vulnerability description indicates that a privilege escalation to configuration service to a specific elevated privilege level may occur and assign an appropriate value to $Scope_{Mod}$. In some embodiments, the configuration service may determine that the device will not allow a privilege escalation to the particular elevated privilege but may allow escalation to a lower privilege level. In such embodiments, providing the privilege escalation score (e.g., a the modified scope attribute 641 to which an appropriate numerical value has been assigned using the lookup table 700) to the weighting function may have the effect of decreasing the vulnerability priority score relative to the baseline priority score indicated by the vulnerability description. In some embodiments, the configuration service may determine that the device configuration allows a privilege escalation (or other scope change) to a level higher than described in the vulnerability description (or allows an escalation even though the vulnerability does not indicate a scope change is possible). In such embodiments, providing the privilege escalation score to the weighting function may have the effect of increasing the vulnerability priority score relative to the baseline priority score indicated by the vulnerability description.

In another example, the configuration service may determine using threat intelligence information (e.g., the threat intelligence data 273 and/or the device activity data 270), that a device has been subject to attempts to exploit the vulnerability described by the vulnerability description. In such instances the configuration service may generate a threat score for use as an appropriate temporal modifier (e.g., the temporal exploitability attribute 651 or, the report confidence attribute 655, discussed above in connection with FIG. 6B or a modifier having a similar effect) having a value assigned according to the lookup table 700 of FIG. 7 or a similar lookup table. In such embodiments, providing a threat score to the weighting function may have the effect of increasing the vulnerability priority score relative to the baseline priority score indicated by the vulnerability description.

Figure 8A:
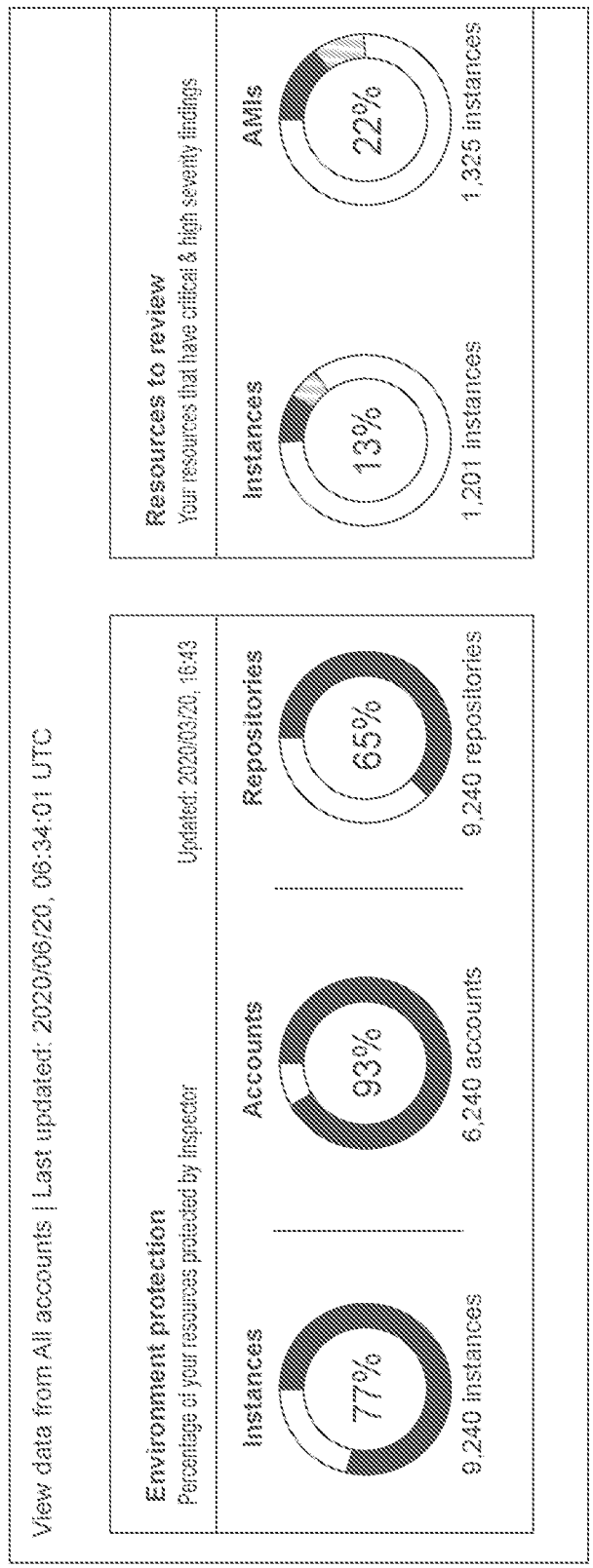

FIGS. 8A-8E show elements of a user interface display for displaying data related to one or more vulnerability reports (e.g., the vulnerability report 295). FIG. 8A shows an example graphical dashboard which may form part of a vulnerability report in some embodiments. The dashboard shows a summary of resources covered a configuration system and hence the vulnerability reports produced by that system. For example, 77% of machine instances (e.g., machine instances 150) are covered, 93% of accounts (e.g., user accounts existing within the VCE 140 of the user 102), and 65% of repositories (e.g., datastores 160) are covered. As shown, a report (or dashboard associated with one or more reports) may summarize findings contained in one more vulnerability reports. For instance, FIG. 8A shows graphics indicating that that 13% of the instances covered have findings that are ranked as "critical" or "high severity." In some embodiments, a configuration service (e.g., the configuration service 120 or 220) may assign qualitative descriptions to vulnerabilities having priority scores within various ranges as shown.

In some embodiments, a configuration service (e.g., the configuration service 120 or 220) may generate a list of remediation actions associated with vulnerabilities, as illustrated in FIG. 8B showing an example user interface display for displaying remediation actions associated with individual vulnerabilities which have priority scores above various predetermined thresholds (e.g., scores corresponding to the descriptors "high severity" or "critical"). The example display shown further displays a number of AMIs having configurations associated with each listed vulnerability (machine images) and the instances (e.g., machine instances 150) instantiated using those images. In some embodiments, elements of the display may be active, allowing a user to select a remediation and cause the remediation to be applied on behalf of the user by a computing resource service provider (e.g., the computing resource service provider 199).

It will be appreciated that in some embodiments, a vulnerability report may include resources and assets of multiple users or account which may represent sub-accounts belonging to a single user or customer of a computing resource service provider. In some embodiments, a configuration service (e.g., the configuration service 120 or 220) may generate reports that summarize vulnerabilities and their respective priorities grouped by sub-accounts and/or other organizational categories and ranked by numbers of vulnerabilities having priority scores above a certain threshold (e.g., those corresponding to a "critical" designation). FIG. 8C shows a summary of vulnerabilities grouped by affected organizational units of a customer of a computing resource service provider. Designations such as the listed units may be defined by a user (e.g., the user 102) using an attribute management service (e.g., the attribute management service 213) to associate computing resources and sub-accounts of the user with the user in account information associated with the user and stored by the computing resource service provider (e.g., the account information 142).

In some embodiments, a configuration service (e.g., the configuration service 120 or 220) may generate lists of assets (e.g., machine instances, datastores, etc.) and allow a user to display those assets, ranked by numbers of vulnerabilities associated with those assets and their priorities, as illustrated in FIGS. 8D-8E showing example user interface displays organizing assets by numbers of vulnerabilities ranked "critical" with respect to those assets. FIG. 8D is an example user interface display listing instances by corresponding "Instance ID" identifiers, an account designation, corresponding machine image identifiers, attribute identifiers (e.g., tags corresponding to various groups and/or sub-accounts defined by the user 102). FIG. 8E is a similar user interface display that lists and ranks repository assets (e.g., datastores 160), and associated information.

Figure 9:
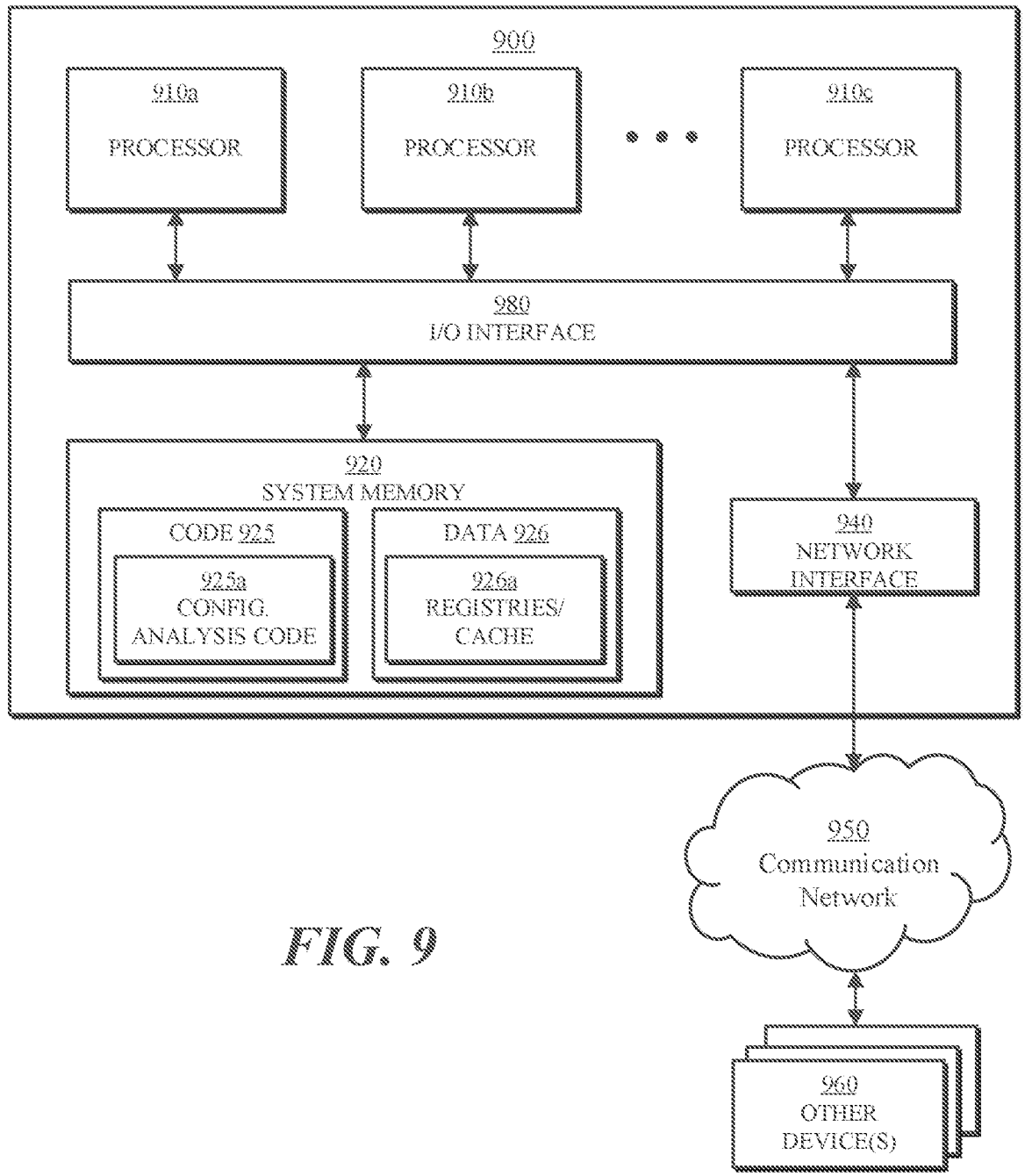
FIG. 9 is a diagram of a computing environment including an example computing device specially configured to implement the presently described systems and methods.

In at least some embodiments, a computing device that implements a portion or all of one or more of the technologies described herein, including, but not limited to, the techniques to implement the functionality of the configuration service 120, can include one or more computer systems that include or are configured to access one or more computer-accessible media. FIG. 9 illustrates such a computing device 900. In the illustrated embodiment, computing device 900 includes one or more processors 910A, 910B, . . . , 910*n* (which may be referred herein singularly as "a processor 910" or in the plural as "the processors 910") coupled to a system memory 920 via an input/output (110) interface 980. Computing device 900 further includes a network interface 940 coupled to 110 interface 980.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, Power PC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods techniques, and data described above, are shown stored within system memory 920 as code 925 and data 926. The code 925 may particularly include configuration analysis program code 925*a* and/or other types of machine-readable instructions executable by one, some, or all of the processors 910a-n to implement the configuration service 120; similarly, the data 926 may particularly include data 926a such as registries, cache layers, configuration information, and so on.

In one embodiment, I/O interface 980 may be configured to coordinate I/O traffic between processor(s) 910a-n, system memory 920, and any peripheral devices in the device, including network interface 940 or other peripheral interfaces. In some embodiments, I/O interface 980 may perform any necessary protocol, timing, or other data transformations to convert data signals from one component (e.g., system memory 920) into a format suitable for use by another component (e.g., processor(s) 910a-n). In some embodiments, I/O interface 980 may include support for devices attached through various types of peripheral buses, such as a variant of the Peripheral Component Interconnect (PCI) bus standard or the Universal Serial Bus (USB) standard, for example. In some embodiments, the function of I/O interface 980 may be split into two or more separate components, such as a north bridge and a south bridge, for example. Also, in some embodiments, some or all of the functionality of I/O interface 980, such as an interface to system memory 920, may be incorporated directly into processor 910.

Network interface 940 may be configured to allow data to be exchanged between computing device 900 and other device or devices 960 attached to a network or network(s) 950, such as user computing devices and other computer systems described above, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fiber Channel SANs or via any other suitable type of network and/or protocol.

In some embodiments, system memory 920 may be one embodiment of a computer-accessible medium configured to store program instructions and data for implementing embodiments of the present methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 900 via I/O interface 980. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940. Portions or all of multiple computing devices, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general-purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may, in some embodiments, be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, as further described by example below.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements change over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, up-front cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager. Such an interface may include capabilities to allow browsing of a resource catalog and details and specifications of the different types or sizes of resources supported and the different reservation types or modes supported, pricing models, and so on.

In accordance with the above description, the present disclosure provides, in an example embodiment, a system that includes one or more processors and memory storing computer-executable instructions. The instructions, when executed by the one or more processors, cause the system to retrieve account information of a user account from a datastore of a computing resource service provider. The account information identifies a virtual machine instance (VMI) operating in a private computing environment of the user within a computing environment of the computing resource service provider. Executing the instructions further causes the system to execute database query to retrieve a vulnerability description from a vulnerability datastore. The vulnerability description is associated with a vulnerability and includes information that encodes a baseline priority score, a baseline access score, and a baseline privilege score. Executing the instructions further causes the system to parse the vulnerability description to determine a first software package associated with the vulnerability and the baseline priority score, the baseline access score, and the baseline privilege score.

The VMI is configured by the computing resource service provider in accordance with device configuration information. Executing the instructions further causes the system to retrieve the device configuration information associated with the VMI from a datastore of the computing resource service provider. Executing the instructions further causes the system to parse the device configuration information to identify a group of software packages installed within the VMI and determine that the first software package is in the group of software packages installed within the VMI. Executing the instructions further causes the system to retrieve network configuration information of the private computing environment that defines a maximum level of network access to the VMI. Executing the instructions further causes the system to determine a maximum privilege level allowed for applications executing within the VMI defined by the device configuration information, convert the maximum level of network access to a system access score according to a predefined vulnerability metric definition, convert the maximum privilege level to a system privilege score according to the predefined vulnerability metric definition, and generate a vulnerability priority score for the vulnerability.

Generating vulnerability priority score for the vulnerability includes providing the baseline priority score, the baseline access score, the baseline privilege score, the system access score, and the system privilege score as inputs to a weighting function specified by the predefined vulnerability metric definition. The weighting function outputs the vulnerability priority score for the vulnerability according to weighting rules specified by the vulnerability metric definition. Executing the instructions further causes the system to display a vulnerability report to the user via a user interface provided by the computing resource service provider, the vulnerability report identifying the vulnerability and associating the vulnerability with the vulnerability priority score In some embodiments, executing the instructions further causes the system to provide the network configuration information to a network access analysis service to determine that the maximum level of network access to the VMI does not allow communication between the VMI and a public network outside the computing environment of the computing resource service provider. In this embodiment, providing the baseline access score, the baseline privilege score, the system access score, and the system privilege score as inputs to the weighting function causes the vulnerability priority score for the vulnerability to indicate a lower priority than indicated by the baseline priority score for remediating the vulnerability according to the vulnerability metric definition.

In some embodiments, the vulnerability description includes an indication that exploiting the vulnerability enables unauthorized access to data. In this embodiment, executing the instructions further causes the system to retrieve an access policy of the private computing environment that defines datastores that may be accessed from the VMI. Executing the instructions further causes the system to query a data management service to determine respective data sensitivity levels associated with each of the datastores. Executing the instructions further causes the system to convert a highest level of data sensitivity level of the respective data sensitivity levels to a data sensitivity score according to the vulnerability metric definition. Executing the instructions further causes the system to provide the data sensitivity score as an additional input to the weighting function specified by the vulnerability metric definition.

In some embodiments, executing the instructions further causes the system to determine that the vulnerability description indicates that exploiting the vulnerability enables a software application to execute with an elevated privilege level and that the elevated privilege level is higher than the maximum privilege level. Executing the instructions further causes the system to calculate a privilege escalation score that corresponds to the maximum privilege level. Executing the instructions further causes the system to provide the privilege escalation score as an additional input to the weighting function, causing the vulnerability priority score to indicate a higher priority than indicated by the baseline priority score for remediating the vulnerability according to the vulnerability metric definition.

In some embodiments, executing the instructions further causes the system to store first device configuration information of the VMI as a first configuration of the VMI and retrieve second device configuration information associated with the VMI. Executing the instructions further causes the system to determine that the second device configuration information is not identical to the first device configuration information. Executing the instructions further causes the system to reevaluate the vulnerability description with respect to the second device configuration information to generate an updated vulnerability priority score for the vulnerability. Executing the instructions further causes the system to update the vulnerability report to associate the vulnerability with the updated vulnerability priority score.

In another example embodiment, a system includes one or more processors and memory storing computer-executable instructions. The instructions, when executed by the one or more processors, cause the system to retrieve a vulnerability description associated with a vulnerability. The vulnerability description indicates a required configuration characteristic of a computing device to exploit the vulnerability, a baseline priority score for the vulnerability, and that exploiting the vulnerability may permit unauthorized access to computing resources. Executing the instructions further causes the system to determine a vulnerability metric definition associated with the vulnerability description. Executing the instructions further causes the system to determine that first device configuration information of a virtual machine instance (VMI). The VMI operates within a private computing environment provided by a computing resource service provider within a computing environment of the computing resource service provider on behalf of a user. Executing the instructions further causes the system to determine that the VMI has the required configuration characteristic. Executing the instructions further causes the system to determine a level of data sensitivity for information accessible from the VMI and generate a vulnerability priority score for the vulnerability.

Generating the vulnerability priority score for the vulnerability includes converting the level of data sensitivity for information accessible from the VMI into a data sensitivity score and providing the baseline priority score and the data sensitivity score as inputs to a weighting function specified by the vulnerability metric definition. The weighting function is configured to output the vulnerability priority score for the vulnerability according to weighting rules specified by the vulnerability metric definition. Executing the instructions further causes display a vulnerability report to the user that identifies the vulnerability and associates the vulnerability with the vulnerability priority score via a user interface provided by the computing resource service provider.

In some embodiments, the vulnerability description indicates that access to the VMI via a public network outside the computing environment of the computing resource service provider is required to exploit the vulnerability and executing the instructions further causes the system to retrieve network configuration information for the private computing environment. Executing the instructions further causes the system to determine that the network configuration information indicates that the VMI is inaccessible to devices outside the computing environment of the computing resource service provider. Executing the instructions further causes the system to generate a system access score that indicates, according to the vulnerability metric definition, that the vulnerability requires direct access to the VMI from a network outside the computing environment of the computing resource service provider than permitted by the private computing environment. Executing the instructions further causes the system to provide the system access score as an additional input to the weighting function that causes the vulnerability priority score to indicate a lower priority than indicated by the baseline priority score according to the vulnerability metric definition.

In some embodiments the vulnerability description indicates a minimum privilege level required to exploit the vulnerability and executing the instructions further causes the system to determine that the first device configuration information for the VMI defines a maximum privilege level allowed for applications executing within the VMI. Executing the instructions further causes the system to convert the minimum privilege level required to exploit the vulnerability to a baseline privilege score. Executing the instructions further causes the system to convert the maximum privilege level to a system privilege score according to the vulnerability metric definition. Executing the instructions further causes the system to provide a weighting factor corresponding to a difference between the baseline privilege score and the system privilege score as an additional input to the weighting function that causes the vulnerability priority score to indicate a lower priority than indicated by the baseline priority score according to the vulnerability metric definition.

In some embodiments, the vulnerability description includes an indication that exploiting the vulnerability may allow unauthorized access to information accessible to applications executing within the VMI and executing the instructions further causes the system to retrieve an access policy associated with the private computing environment of the user that defines a first datastore that is accessible to applications executing within the VMI. Executing the instructions further causes the system to query a data management service to determine a first level of data sensitivity associated with the first datastore. Executing the instructions further causes the system to generate a data sensitivity score by determining a value corresponding to the first level of data sensitivity. Generating the vulnerability priority score further includes providing the data sensitivity score as an additional input to the weighting function according to the vulnerability metric definition.

In one such embodiment executing the instructions further causes the system to determine that the access policy defines a second datastore that is accessible to applications executing within the VMI. Executing the instructions further causes the system to query a data management service to determine a second level of data sensitivity associated with the second datastore. Executing the instructions further causes the system to generate the data sensitivity score. Generating the data sensitivity score includes determining that the second level of data sensitivity describes data that are more sensitive than data described by the first level of data sensitivity and determining, as the data sensitivity score, a value corresponding to the second level of data sensitivity.

In one such embodiment executing the instructions further causes the system to determine that the first level of data sensitivity indicates that the first datastore does not store sensitive data. Providing the data sensitivity score as an additional input to the weighting function causes the vulnerability priority score to indicate a lower priority for mitigating the vulnerability than indicated by the baseline priority score according to the vulnerability metric definition.

In some embodiments the vulnerability description includes an indication that exploiting the vulnerability may allow unauthorized access to information accessible to applications executing within the VMI and executing the instructions further causes the system to retrieve an access policy associated with the private computing environment of the user that allows an on-demand computing process executed outside the private computing environment to be controlled by applications executing within the VMI. Executing the instructions further causes the system to determine that the access policy defines a first datastore that may be accessed by the on-demand computing process. Executing the instructions further causes the system to query a data management service to determine a first level of data sensitivity associated with the first datastore. Executing the instructions further causes the system to convert the first level of data sensitivity to a data sensitivity score. Generating the vulnerability priority score for the vulnerability further includes providing the data sensitivity score as an additional input to the weighting function according to the vulnerability metric definition.

In some embodiments executing the instructions further causes the system to retrieve second device configuration information associated with the VMI. Executing the instructions further causes the system to determine the first device configuration information and the second device configuration information differ. Executing the instructions further causes the system to generate an updated vulnerability priority score for the vulnerability by reevaluating the vulnerability description with respect to the second device configuration information associated with the VMI.

In some embodiments the vulnerability description indicates a system activity profile associated by the system with attempts to exploit the vulnerability and executing the instructions further causes the system to retrieve system activity information associated with the VMI. Executing the instructions further causes the system to determine that the system activity information associated with the VMI conforms to the system activity profile associated by the system with attempts to exploit the vulnerability. Executing the instructions further causes the system to generate a threat score that indicates attempts to exploit the vulnerability according to the vulnerability metric definition. Executing the instructions further causes the system to provide the threat score as an additional input to the weighting function that causes the vulnerability priority score to indicate a higher priority for mitigating the vulnerability than indicated by the baseline priority score according to the vulnerability metric definition.

In another example embodiment, a method of automatically evaluating a configuration of a computing system includes retrieving a vulnerability description associated with a vulnerability, the vulnerability description indicating that exploiting the vulnerability may permit unauthorized access to computing resources and indicating a required configuration characteristic of a computing device to exploit the vulnerability, and a baseline priority score for the vulnerability. The method further includes determining a vulnerability metric definition associated with the vulnerability description, and determining that first device configuration information of a virtual machine instance (VMI) has the required configuration characteristic. The VMI operates within a private computing environment provided by a computing resource service provider for use by a user.

The method further includes determining a level of data sensitivity for information accessible from the VMI and generating a vulnerability priority score for the vulnerability. Generating the vulnerability priority score for the vulnerability includes extracting a baseline priority score indicated by the vulnerability description, converting the level of data sensitivity for information accessible from the VMI into a data sensitivity score, and providing the baseline priority score and the data sensitivity score as inputs to a weighting function specified by the vulnerability metric definition. The weighting function is configured to output a vulnerability priority score for the vulnerability according to weighting rules specified by the vulnerability metric definition. The method further includes displaying a vulnerability report to the user that identifies the vulnerability and associates the vulnerability with the vulnerability priority score via a user interface provided by the computing resource service provider.

In some embodiments the vulnerability description indicates that access to the VMI via a public network outside the computing environment of the computing resource service provider is required to exploit the vulnerability and the method further includes retrieving network configuration information for the private computing environment. The method further includes determining that the network configuration information indicates that the VMI is inaccessible to devices outside the computing environment of the computing resource service provider. The method further includes generating an access score that indicates, according to the vulnerability metric definition that the vulnerability requires a higher level of network access to the VMI than permitted by the private computing environment. The method further includes providing the access score as an additional input to the weighting function that causes the vulnerability priority score to indicate a lower priority than indicated by the baseline priority score according to the vulnerability metric definition.

In some embodiments, the vulnerability description indicates a minimum privilege level required to exploit the vulnerability and the method further includes, determining that the first device configuration information for the VMI that defines a maximum privilege level allowed for applications executing within the VMI. The method further includes converting the minimum privilege level required to exploit the vulnerability to a privilege requirement score. The method further includes converting the maximum privilege level to a system privilege score according to the vulnerability metric definition. The method further includes determining that the system privilege score is lower than the privilege requirement score. The method further includes providing a weighting factor corresponding to the system privilege score as an additional input to the weighting function that causes the vulnerability priority score to indicate a lower priority than indicated by the baseline priority score according to the vulnerability metric definition.

In some embodiments, the method further includes retrieving an access policy associated with the private computing environment of the user that defines a first datastore that is accessible to applications executing within the VMI. The method further includes querying a data management service to determine a first level of data sensitivity associated with the first datastore. The method further includes generating a data sensitivity score by determining a value corresponding to the first level of data sensitivity. Generating the vulnerability priority score further includes providing the data sensitivity score as an additional input to the weighting function according to the vulnerability metric definition.

In some embodiments, the method further includes retrieving second device configuration information associated with the VMI. The method further includes determining the first device configuration information and the second device configuration information differ. The method further includes generating an updated vulnerability priority score for the vulnerability by reevaluating the vulnerability description with respect to the second device configuration information associated with the VMI. The method further includes generating an updated vulnerability report that associates the vulnerability with the updated vulnerability priority score. The method further includes determining that a change between the vulnerability priority score and the updated vulnerability priority score exceeds a predetermined threshold. The method further includes transmitting a notification to the user via the user interface prompting the user to access the vulnerability report via the user interface.

In some embodiments, the vulnerability description indicates a system activity profile associated by the system with attempts to exploit the vulnerability and the method further includes retrieving system activity information associated with the VMI. The method further includes determining that the device activity information associated with the VMI conforms to the system activity profile associated by the system with attempts to exploit the vulnerability. The method further includes generating a threat score that indicates attempts to exploit the vulnerability have occurred according to the vulnerability metric definition; The method further includes providing the threat score as an additional input to the weighting function that causes the vulnerability priority score to indicate a higher priority for mitigating the vulnerability than indicated by the baseline priority score according to the vulnerability metric definition.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UPnP"), Network ("NFS"), Common Internet ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of datastores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference.

What is claimed is:

1. A method for evaluating a computing system, the method comprising:
    a) selecting, from a list of vulnerability descriptions associated with vulnerabilities, one of the vulnerability descriptions associated with one of the vulnerabilities, the one of the vulnerabilities having a baseline priority score indicative of an estimate of a severity of the one of the vulnerabilities that does not account for mitigating factors or exacerbating factors unique to particular circumstances of the one of the vulnerabilities;
    b) selecting, from a list of computing devices operating within a computing environment, one of the computing devices;
    c) receiving network configuration information of the computing environment that defines a maximum level of network access to the one of the computing devices, and determining a maximum privilege level allowed for applications executing within the one of the computing devices;
    d) converting the maximum level of network access to a system access score according to a predefined vulnerability metric definition, and converting the maximum privilege level to a system privilege score according to the predefined vulnerability metric definition;
    e) evaluating, based at least in part on information accessible to the one of the computing devices, the one of the vulnerabilities for the one of the computing devices, including generating a vulnerability priority score for the one of the vulnerabilities with respect to the one of the computing devices by:
        converting a level of data sensitivity for the information accessible to the one of the computing devices into a data sensitivity score; and
        providing the baseline priority score, the data sensitivity score, the system access score, and the system privilege score as inputs to a weighting function, the weighting function configured to output the vulnerability priority score for the one of the vulnerabilities according to weighting rules of the weighting function;
    f) repeating steps b) through e) for additional ones of the computing devices from the list of computing devices;
    g) selecting or generating, from the vulnerability priority scores generated in step e), a representative vulnerability priority score indicating an aggregate vulnerability priority score for the one of the vulnerabilities with respect to the computing devices;
    h) repeating steps a) through g) for additional ones of the vulnerability descriptions from the list of vulnerability descriptions; and
    i) generating a vulnerability report listing the vulnerabilities corresponding to each vulnerability description and corresponding vulnerability priority score indicating a relative importance of mitigating each vulnerability.

2. The method of claim 1, further comprising determining the level of data sensitivity for the information accessible to the one of the computing devices.

3. The method of claim 2, wherein determining the level of data sensitivity for the information accessible to the one of the computing devices comprises querying a data management service of a computing resource service provider.

4. The method of claim 1, wherein selecting or generating the representative vulnerability priority score comprises selecting a highest score from among the vulnerability priority scores generated in step e).

5. The method of claim 1, wherein selecting or generating the representative vulnerability priority score comprises generating an arithmetic mean or a geometric mean for the vulnerability priority scores generated in step e).

6. The method of claim 1, wherein the one of the vulnerability descriptions includes an indication that exploiting the one of the vulnerabilities enables unauthorized access to data, and wherein the method further comprises:
   retrieving an access policy that defines datastores that may be accessed from the one of the computing devices;
   querying a data management service to determine respective data sensitivity levels associated with each of the datastores;
   converting a highest level of data sensitivity level of the respective data sensitivity levels to a data sensitivity score; and
   providing the data sensitivity score as an additional input to the weighting function.

7. The method of claim 1, further comprising:
   determining that the one of the vulnerability descriptions indicates that exploiting the one of the vulnerabilities enables a software application to execute with an elevated privilege level;
   determining that the elevated privilege level is higher than the maximum privilege level;
   calculating a privilege escalation score that corresponds to the maximum privilege level; and
   providing the privilege escalation score as an additional input to the weighting function, causing the vulnerability priority score to indicate a higher priority than indicated by the baseline priority score for remediating the one of the vulnerabilities.

8. A method for evaluating a computing system, the method comprising:
   a) selecting, from a list of computing devices operating within a computing environment, one of the computing devices;
   b) selecting, from a list of vulnerability descriptions associated with vulnerabilities, one of the vulnerability descriptions associated with one of the vulnerabilities, the one of the vulnerabilities having a baseline priority score indicative of an estimate of a severity of the one of the vulnerabilities that does not account for mitigating factors or exacerbating factors unique to particular circumstances of the one of the vulnerabilities;
   c) receiving network configuration information of the computing environment that defines a maximum level of network access to the one of the computing devices, and determining a maximum privilege level allowed for applications executing within the one of the computing devices;
   d) converting the maximum level of network access to a system access score according to a predefined vulnerability metric definition, and converting the maximum privilege level to a system privilege score according to the predefined vulnerability metric definition;
   e) evaluating, based at least in part on information accessible to the one of the computing devices, the one of the vulnerabilities for the one of the computing devices, including generating a vulnerability priority score for the one of the vulnerabilities with respect to the one of the computing devices by:
      converting a level of data sensitivity for the information accessible to the one of the computing devices into a data sensitivity score; and
      providing the baseline priority score the data sensitivity score, the system access score, and the system privilege score as inputs to a weighting function, the weighting function configured to output the vulnerability priority score for the one of the vulnerabilities according to weighting rules of the weighting function;
   f) repeating steps b) through e) for additional ones of the vulnerability descriptions from the list of vulnerability descriptions;
   g) selecting or generating, from the vulnerability priority scores generated in step e), a representative vulnerability priority score indicating an aggregate vulnerability priority score for the vulnerabilities with respect to the one of the computing devices;
   h) repeating steps a) through g) for additional ones of the computing devices from the list of computing devices; and
   i) generating a vulnerability report listing the vulnerabilities corresponding to each vulnerability description and corresponding vulnerability priority score indicating a relative importance of mitigating each vulnerability.

9. The method of claim 8, further comprising determining the level of data sensitivity for the information accessible to the one of the computing devices.

10. The method of claim 9, wherein determining the level of data sensitivity for the information accessible to the one of the computing devices comprises querying a data management service of a computing resource service provider.

11. The method of claim 8, wherein selecting or generating the representative vulnerability priority score comprises selecting a highest score from among the vulnerability priority scores generated in step e).

12. The method of claim 8, wherein selecting or generating the representative vulnerability priority score comprises generating an arithmetic mean or a geometric mean for the vulnerability priority scores generated in step e).

13. The method of claim 8, wherein the one of the vulnerability descriptions includes an indication that exploiting the one of the vulnerabilities enables unauthorized access to data, and wherein the method further comprises:
   retrieving an access policy that defines datastores that may be accessed from the one of the computing devices;
   querying a data management service to determine respective data sensitivity levels associated with each of the datastores;
   converting a highest level of data sensitivity level of the respective data sensitivity levels to a data sensitivity score; and
   providing the data sensitivity score as an additional input to the weighting function.

14. A system comprising one or more processors and memory storing computer-executable instructions that, when executed by the one or more processors, cause the system to:
   a) select, from a list of vulnerability descriptions associated with vulnerabilities, one of the vulnerability descriptions associated with one of the vulnerabilities, the one of the vulnerabilities having a baseline priority score indicative of an estimate of a severity of the one of the vulnerabilities that does not account for mitigating factors or exacerbating factors unique to particular circumstances of the one of the vulnerabilities;

b) select, from a list of computing devices, one of the computing devices;

c) receive network configuration information of the computing environment that defines a maximum level of network access to the one of the computing devices, and determining a maximum privilege level allowed for applications executing within the one of the computing devices;

d) convert the maximum level of network access to a system access score according to a predefined vulnerability metric definition, and converting the maximum privilege level to a system privilege score according to the predefined vulnerability metric definition;

e) evaluate, based at least in part on information accessible to the one of the computing devices, the one of the vulnerabilities for the one of the computing devices, including generating a vulnerability priority score for the one of the vulnerabilities with respect to the one of the computing devices by:

converting a level of data sensitivity for the information accessible to the one of the computing devices into a data sensitivity score; and providing the baseline priority score the data sensitivity score, the system access score, and the system privilege score as inputs to a weighting function, the weighting function configured to output the vulnerability priority score for the one of the vulnerabilities according to weighting rules of the weighting function;

f) repeat steps b) through e) for additional ones of the computing devices from the list of computing devices;

g) select or generate, from the vulnerability priority scores generated in step e), a representative vulnerability priority score indicating an aggregate vulnerability priority score for the one of the vulnerabilities with respect to the computing devices;

h) repeat steps a) through g) for additional ones of the vulnerability descriptions from the list of vulnerability descriptions; and i) generate a vulnerability report listing the vulnerabilities corresponding to each vulnerability description and corresponding vulnerability priority score indicating a relative importance of mitigating each vulnerability.

15. The system of claim 14, wherein the instructions comprise further instructions that, when executed by the one or more processors, further cause the system to determine the level of data sensitivity for the information accessible to the one of the computing devices.

16. The system of claim 15, wherein determining the level of data sensitivity for the information accessible to the one of the computing devices comprises querying a data management service of a computing resource service provider.

17. The system of claim 14, wherein selecting or generating the representative vulnerability priority score comprises selecting a highest score from among the vulnerability priority scores generated in step e).

18. The system of claim 14, wherein selecting or generating the representative vulnerability priority score comprises generating an arithmetic mean or a geometric mean for the vulnerability priority scores generated in step e).

19. The system of claim 14, wherein the one of the vulnerability descriptions includes an indication that exploiting the one of the vulnerabilities enables unauthorized access to data, and wherein the instructions comprise further instructions that, when executed by the one or more processors, further cause the system to:

retrieve an access policy that defines datastores that may be accessed from the one of the computing devices;

query a data management service to determine respective data sensitivity levels associated with each of the datastores;

convert a highest level of data sensitivity level of the respective data sensitivity levels to a data sensitivity score; and provide the data sensitivity score as an additional input to the weighting function.

20. The system of claim 14, wherein the instructions comprise further instructions that, when executed by the one or more processors, further cause the system to:

determine that the one of the vulnerability descriptions indicates that exploiting the one of the vulnerabilities enables a software application to execute with an elevated privilege level;

determine that the elevated privilege level is higher than the maximum privilege level;

calculate a privilege escalation score that corresponds to the maximum privilege level; and provide the privilege escalation score as an additional input to the weighting function, causing the vulnerability priority score to indicate a higher priority than indicated by the baseline priority score for remediating the one of the vulnerabilities.

* * * * *